(12) United States Patent
Burgers et al.

(10) Patent No.: US 11,239,512 B2
(45) Date of Patent: Feb. 1, 2022

(54) COUNTERFLOW HEAT EXCHANGER WITH SIDE ENTRY FITTINGS

(71) Applicant: Dana Canada Corporation, Oakville (CA)

(72) Inventors: John G. Burgers, Oakville (CA); Kenneth M. A. Abels, Oakville (CA); Brian E. Cheadle, Brampton (CA)

(73) Assignee: Dana Canada Corporation, Oakville (CA)

( * ) Notice: Subject to any disclaimer, the term of this patent is extended or adjusted under 35 U.S.C. 154(b) by 128 days.

(21) Appl. No.: 15/980,780

(22) Filed: May 16, 2018

(65) Prior Publication Data

US 2018/0337434 A1    Nov. 22, 2018

Related U.S. Application Data

(60) Provisional application No. 62/506,961, filed on May 16, 2017.

(51) Int. Cl.
  *H01M 10/6556*  (2014.01)
  *F28F 9/02*  (2006.01)
  (Continued)

(52) U.S. Cl.
  CPC .......... *H01M 10/6556* (2015.04); *F28F 3/12* (2013.01); *F28F 9/02* (2013.01); *F28F 9/0221* (2013.01);
  (Continued)

(58) Field of Classification Search
  CPC .......... H01M 10/6556; H01M 10/613; H01M 10/625; F28F 3/12; F28F 9/02;
  (Continued)

(56) References Cited

U.S. PATENT DOCUMENTS 3,424,238 A  *  1/1969  McWilliams  ............. F28F 3/12
                                              165/133
4,653,581 A  *  3/1987  Yogo  .................... F28D 9/0075
                                              165/166

(Continued)

FOREIGN PATENT DOCUMENTS

DE    102012021990 A1    7/2013
DE    102012006122 A1    9/2013

OTHER PUBLICATIONS

Canadian Intellectual Property Office, International Search Report with written opinion issued in Application PCT/CA2018/050580, dated Jul. 25, 2018, 11 pages, Canadian Intellectual Property Office, Quebec Canada.

*Primary Examiner* — Tho V Duong
*Assistant Examiner* — Raheena R Malik
(74) *Attorney, Agent, or Firm* — McCoy Russell LLP

(57) ABSTRACT

A battery cell heat exchanger having a pair of plates that together define a fluid passage having a first channel permitting fluid flow from a first end of the plate pair towards a second end of the plate pair, and a second channel permitting fluid flow from the second end towards the first end of the plate pair. The plate pair together defining a first conduit at the first end of the plate pair, the first conduit being in fluid communication with the first channel. One of the pair of plates having an aperture permitting fluid flow from the second channel to a duct, the duct coupled to the one of the pair of plates having the aperture and having a second conduit in fluid communication with the aperture; where the first conduit and the second conduit lie in the plane defined by the pair of plates.

18 Claims, 29 Drawing Sheets

(51) Int. Cl.
*H01M 10/613* (2014.01)
*F28F 3/12* (2006.01)
*H01M 10/625* (2014.01)

(52) U.S. Cl.
CPC .......... *F28F 9/0248* (2013.01); *F28F 9/0273* (2013.01); *F28F 9/0278* (2013.01); *H01M 10/613* (2015.04); *H01M 10/625* (2015.04)

(58) Field of Classification Search
CPC ........ F28F 9/0221; F28F 9/0248; F28F 9/273; F28F 9/0278
USPC .......................................................... 165/80.4
See application file for complete search history.

(56) References Cited

U.S. PATENT DOCUMENTS

| | | | | |
|---|---|---|---|---|
| 4,872,578 A * | 10/1989 | Fuerschbach | ........... | F28D 9/005 165/167 |
| 5,409,058 A * | 4/1995 | Yuasa | ........... | F28D 9/005 165/140 |
| 5,429,183 A * | 7/1995 | Hisamori | ........... | F28D 9/005 165/134.1 |
| 5,510,207 A * | 4/1996 | Grivel | ........... | F28F 3/12 429/120 |
| 5,630,326 A * | 5/1997 | Nishishita | ........... | F16L 39/00 62/299 |
| 5,678,422 A * | 10/1997 | Yoshii | ........... | F25B 39/022 62/513 |
| 5,724,817 A * | 3/1998 | Nishishita | ........... | F28F 9/0246 62/216 |
| 6,039,112 A * | 3/2000 | Ruppel | ........... | F28D 9/005 165/109.1 |
| 6,164,371 A * | 12/2000 | Bertilsson | ........... | F28D 9/005 165/140 |
| 6,170,567 B1 * | 1/2001 | Nakada | ........... | F28D 1/0375 165/153 |
| 6,673,098 B1 * | 1/2004 | Machold | ........... | A61F 7/12 607/96 |
| 6,959,492 B1 * | 11/2005 | Matsumoto | ........... | F28D 9/0075 29/890.039 |
| 7,093,649 B2 * | 8/2006 | Dawson | ........... | F28D 9/0031 165/166 |
| 7,658,224 B2 * | 2/2010 | Beech | ........... | F28D 1/0308 165/170 |
| 2003/0201094 A1 * | 10/2003 | Evans | ........... | F28F 3/027 165/109.1 |
| 2005/0115700 A1 * | 6/2005 | Martin | ........... | F28F 3/02 165/170 |
| 2005/0170240 A1 | 8/2005 | German et al. | | |
| 2008/0090123 A1 * | 4/2008 | Peng | ........... | H01M 8/0278 429/437 |
| 2009/0325054 A1 | 12/2009 | Payne et al. | | |
| 2010/0132930 A1 * | 6/2010 | Izenson | ........... | F28D 5/00 165/168 |
| 2012/0082880 A1 | 4/2012 | Koetting et al. | | |
| 2012/0237805 A1 * | 9/2012 | Abels | ........... | H01M 2/1077 429/83 |
| 2013/0071720 A1 | 3/2013 | Zahn | | |
| 2013/0244077 A1 | 9/2013 | Palanchon et al. | | |
| 2014/0162107 A1 * | 6/2014 | Obrist | ........... | F28F 3/12 429/120 |
| 2014/0225363 A1 * | 8/2014 | Burgers | ........... | F28F 9/0258 285/124.5 |
| 2015/0180059 A1 * | 6/2015 | Vanderwees | ........... | H01M 8/04074 261/102 |
| 2016/0036104 A1 * | 2/2016 | Kenney | ........... | H01M 10/6556 429/120 |
| 2016/0204486 A1 | 7/2016 | Kenney et al. | | |
| 2016/0238323 A1 * | 8/2016 | Jones | ........... | F28D 1/0383 |
| 2016/0315365 A1 | 10/2016 | Vanderwees et al. | | |
| 2016/0359211 A1 | 12/2016 | Kenney et al. | | |

* cited by examiner

COUNTERFLOW HEAT EXCHANGER WITH SIDE ENTRY FITTINGS

FIELD

This disclosure relates to heat exchangers for battery thermal management applications. More specifically, the disclosure relates to a battery cell heat exchanger that can be arranged underneath a stack of a plurality of adjacent battery cells or battery cell containers or that can be arranged in between the adjacent battery cells or battery cell containers within a stack, the battery cell heat exchanger dissipating heat in rechargeable battery units.

BACKGROUND

Rechargeable batteries such as batteries made up of many lithium-ion cells can be used in many applications, including for example, electric propulsion vehicle ("EV") and hybrid electric vehicle ("HEV") applications. These applications often require advanced battery systems that have high energy storage capacity and can generate large amounts of heat that needs to be dissipated. Battery thermal management of these types of systems generally requires that the maximum temperature of the individual cells be below a predetermined, specified temperature.

Cold plate heat exchangers are heat exchangers upon which a stack of adjacent battery cells or battery cell containers housing one or more battery cells are arranged for cooling and/or regulating the temperature of a battery unit. The individual battery cells or battery cell containers are arranged in face-to-face contact with each other to form the stack, the stack of battery cells or battery cell containers being arranged on top of a cold plate heat exchanger such that an end face or end surface of each battery cell or battery cell container is in surface-to-surface contact with a surface of the heat exchanger.

Examples of cold plate heat exchangers and inter-cell elements are described in commonly assigned U.S. patent application Ser. No. 14/972,463 entitled COUNTER-FLOW HEAT EXCHANGER FOR BATTERY THERMAL MANAGEMENT APPLICATIONS, which is incorporated herein by reference in its entirety.

Each cold plate heat exchanger includes an inlet and an outlet for the cooling fluid, and the inlet and outlet may be provided with fittings to permit connection of the heat exchanger to a coolant circulation system of the vehicle. Due to space constraints, the location and orientation of these fittings is significant, and it is desirable to design these heat exchangers such that the fitting locations and/or orientations can be varied with minimal retooling. In addition, such fittings are positioned to extend perpendicular to the plane defined by the plates of the heat exchanger.

There is a need in the art for cold plate heat exchangers having side entry fittings, where the fittings extend in a plane defined by the heat exchanger plates.

SUMMARY OF INVENTION

In one aspect, the specification relates to a battery cell heat exchanger having:
a pair of plates coupled at edges of the pair of plates, the pair of plates together defining a fluid passage having a first channel permitting fluid flow from a first end of the pair of plates towards a second end of the pair of plates, and a second channel permitting fluid flow from the second end to towards the first end of the pair of plates;
an inlet or outlet at the first end of the pair of plates, the inlet or outlet being in fluid communication with the first channel; and
one of the pair of plates having an aperture permitting fluid flow from the second channel to a conduit or duct, the conduit or duct coupled to the one of the pair of plates having the aperture; and
the other of the inlet or outlet in fluid communication with the conduit or duct;
wherein the inlet and the outlet lie in the plane defined by the pair of plates.

BRIEF DESCRIPTION OF THE DRAWINGS

Reference will now be made, by way of example, to the accompanying drawings which show example embodiments of the present application, and in which:

FIG. 1A is a schematic illustration of a battery unit incorporating a battery cooling heat exchanger in the form of individual heat exchanger panels;

Similar reference numerals may have been used in different figures to denote similar components.

DESCRIPTION OF EXAMPLE EMBODIMENTS

Figure 1:
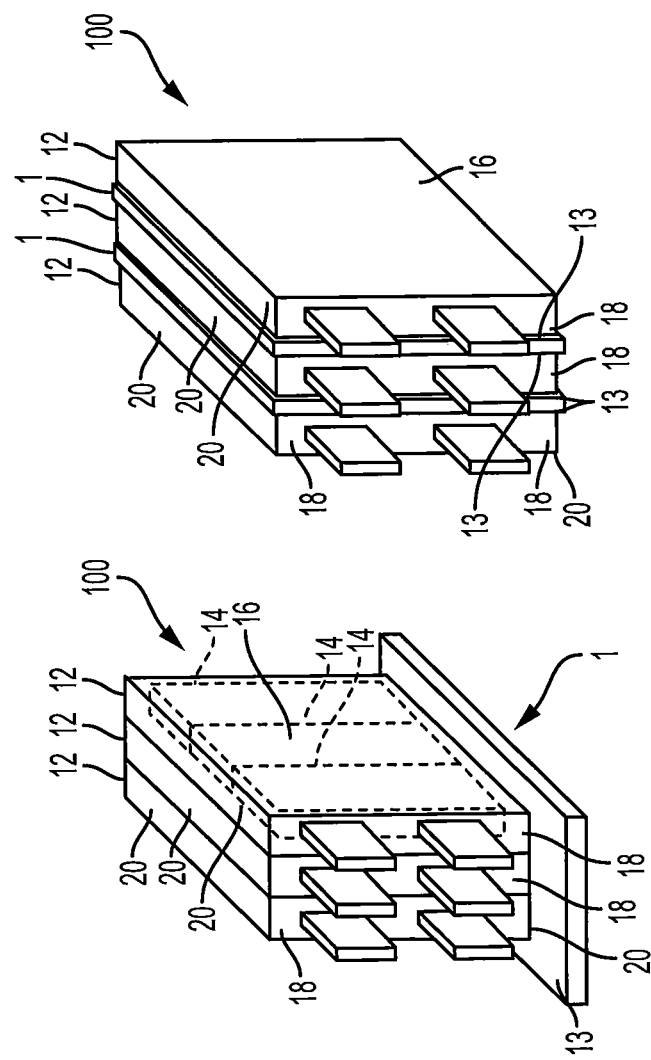
FIG. 1 is a schematic illustration of a battery unit incorporating a battery cooling heat exchanger in the form of a cold plate heat exchanger.
Figure 2:
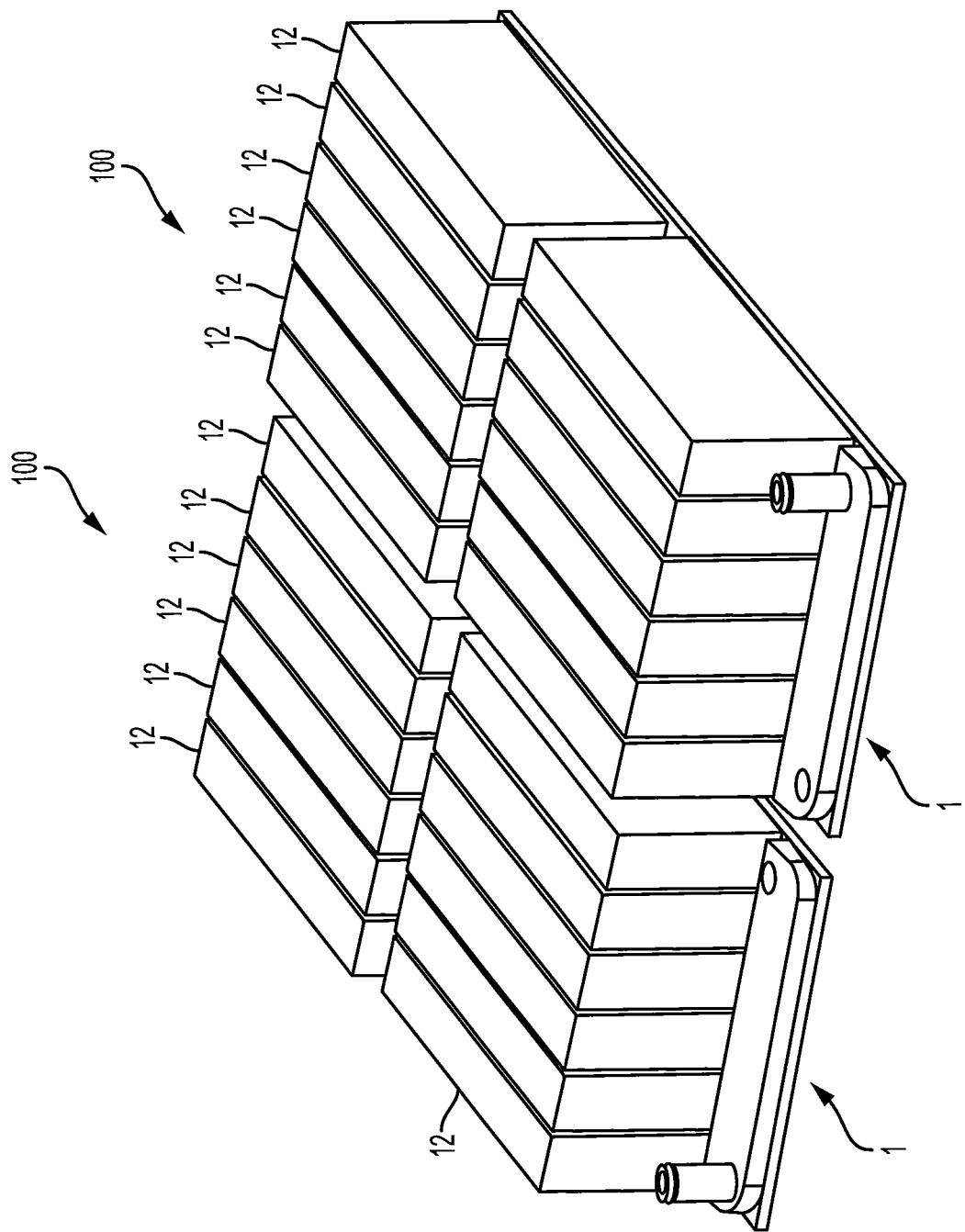
FIG. 2 is a schematic illustration of an alternate embodiment of a battery unit incorporating a battery cooling heat exchanger in the form of a cold plate heat exchanger.

FIGS. 1 and 2 show battery cooling heat exchanger constructions as described in above-mentioned U.S. patent application Ser. No. 14/972,463, and are labeled "PRIOR ART".

Referring now to FIG. 1, there is shown a schematic, illustrative example of a rechargeable battery unit 100 employing a battery cooling heat exchanger 1. The battery unit 100 is made up of a series of individual battery cell containers 12 that may each house one or more battery cells 14. While three individual battery cells 14 are schematically illustrated in FIG. 1, it will be understood that the number of battery cells 14 housed within the battery cell container 12 may vary depending upon the particular design and/or application of the battery unit 100 and that the present disclosure is not intended to be limited to battery units having three battery cell containers 12 with three battery cells 14 arranged therein.

The individual battery cell containers 12 that house the one or more battery cells 14 each define a pair of opposed long, side faces 16, a pair of opposed, short side faces 18 and a pair of end faces 20 arranged generally perpendicular to the side faces 16, 18. In the illustrative example shown in FIG. 1, the individual battery cell containers 12 are arranged so that the long side faces 16 of adjacent battery cell containers 12 are in face-to-face or surface-to-surface contact with each other as they are stacked together to form the battery unit 100, the plurality of battery cell containers 12 being stacked on top of the battery cooling heat exchanger 1. Accordingly, in the arrangement illustrated in FIG. 1, one of the end faces 20 of each battery cell container 12 is in surface-to-surface contact with a primary heat transfer surface 13 of the heat exchanger 1. In such an arrangement, the battery cooling heat exchanger 1 is often referred to as a cold plate or cold plate heat exchanger as the battery cell containers 12 are in contact with only one side of the heat exchanger 1. As a result of this arrangement, cold plate heat exchangers typically provide a large surface area for accommodating battery stacks made up of a plurality of battery cell containers 12, the large surface area functioning as the primary heat transfer surface 13 of the heat exchanger 1. Cold plate heat exchangers also tend to be more robust in structure as the heat exchanger must support the plurality of battery cell containers 12 stacked on top of the heat exchanger 1. In some embodiments, multiple battery units 100 that each comprise a series of adjacent battery cell containers 12 housing one or more battery cells 14 are arranged on a single battery cooling heat exchanger 1 or cold plate as shown, for instance, in FIG. 2.

Referring now to FIG. 1A there is shown an illustrative example of a battery cooling heat exchanger 1. As shown, the individual battery cell containers 12 are arranged so as to be sandwiched between individual battery cooling heat exchangers 1 (or heat exchanger panels or plates, sometimes referred to as cooling plates or fins). Although not illustrated in the drawings, battery cell heat exchangers 1 can also be arranged at either end of the battery unit 100 to ensure that each long side panel 16 of each battery cell container 12 is in contact with a battery cell heat exchanger 1.

Therefore, the arrangement of FIG. 1 provides a single battery cell heat exchanger (or cold plate) 1 to cool the entire battery unit 100, with the smaller end faces 20 of the battery cell containers 12 stacked on top of a single primary heat transfer surface 13 of heat exchanger 1. In contrast, the arrangement of FIG. 1A provides a plurality of battery cell heat exchangers 1 to cool the larger side faces 16 of the battery cell containers 12, heat exchangers 1 each having a pair of opposed primary heat transfer surfaces 13 for contacting the adjacent battery cell container 12, with the heat exchangers 1 and containers 12 being interleaved with or sandwiched between one another.

Therefore, in the example of FIG. 1 only one side of the battery cooling heat exchanger 1 is in contact with the battery cells 14 and/or battery cell containers 12, while in the example of FIG. 1A both sides of the battery cooling heat exchangers 1 are in contact with the battery cell containers 12.

Figure 3:
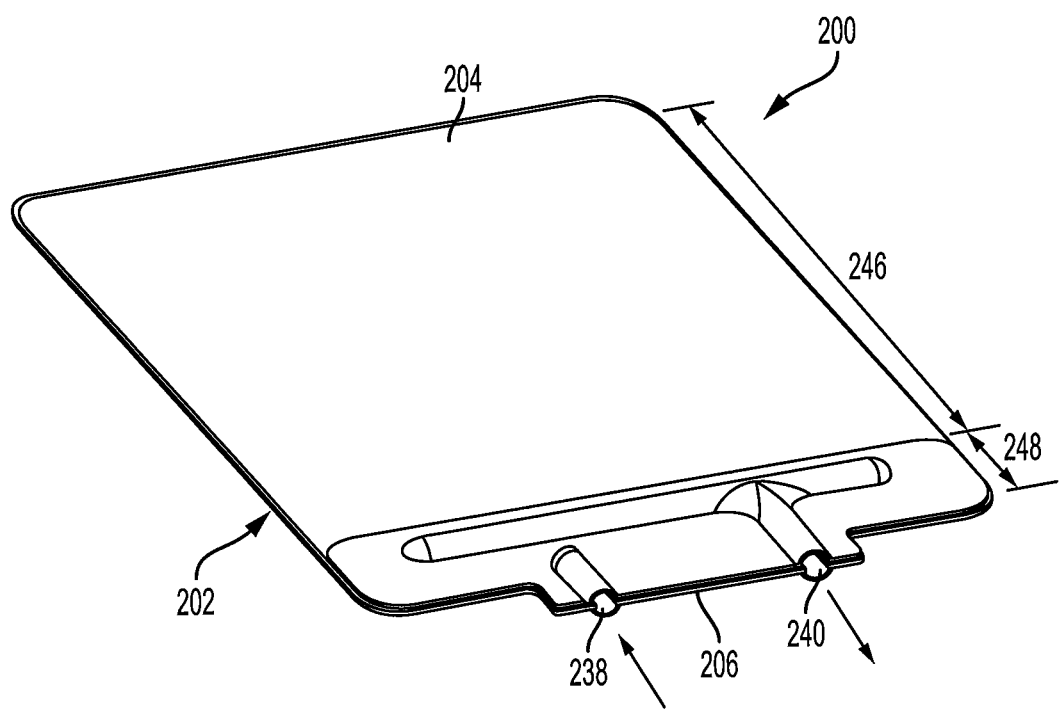
FIG. 3 is an isometric view of a first embodiment of a battery cell heat exchanger in accordance with specification.
Figure 4:
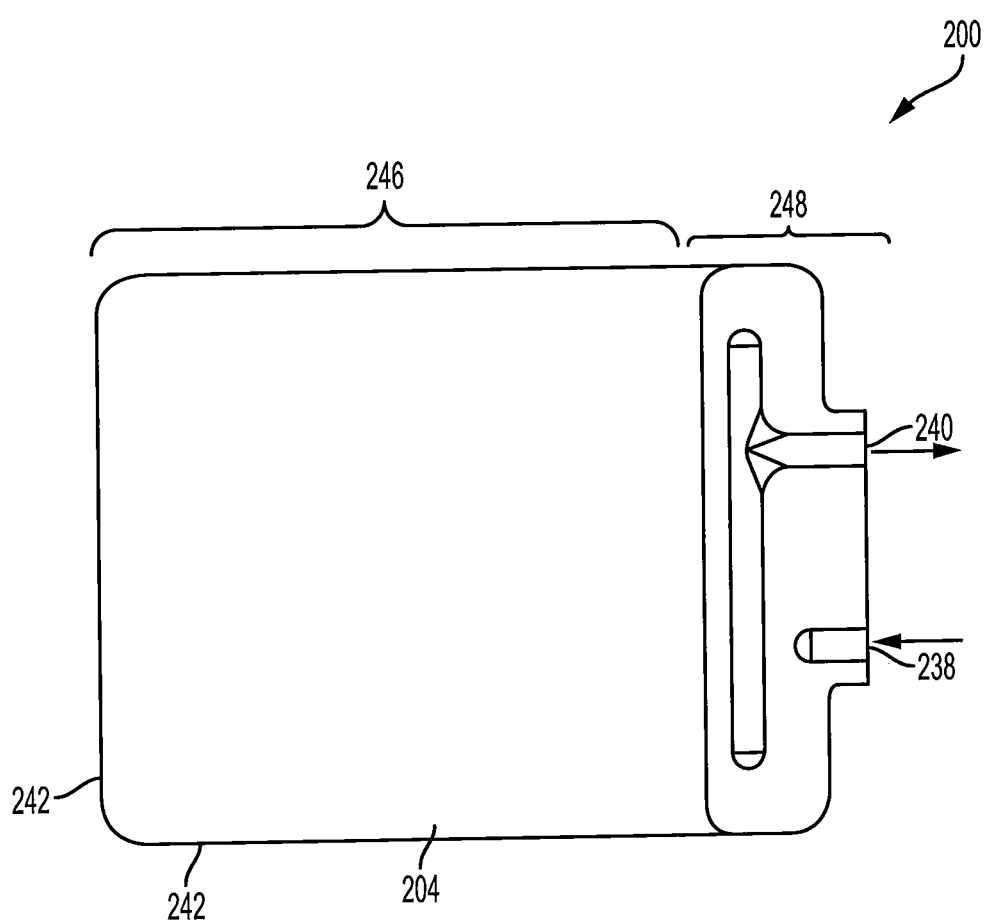
FIG. 4 is a top plan view of a first embodiment of a battery cell heat exchanger in accordance with specification.
Figure 5:
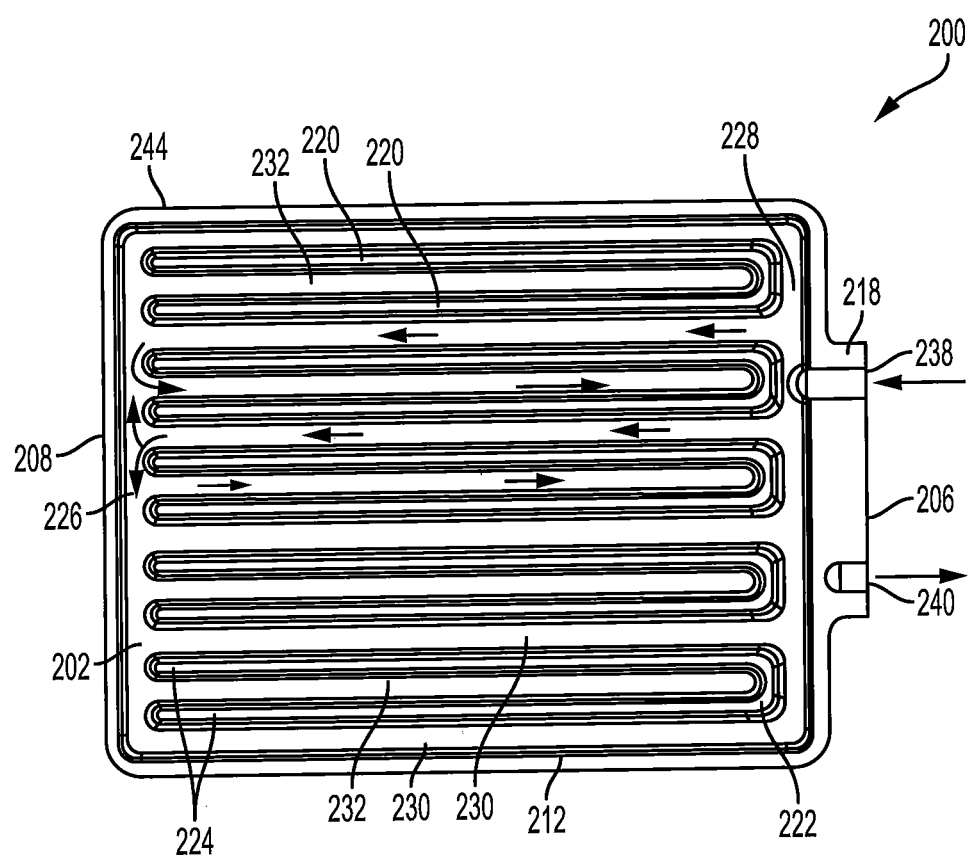
FIG. 5 is a bottom plan view of a first embodiment of a battery cell heat exchanger in accordance with specification.

FIGS. 3-8 disclose a first embodiment of a battery cell heat exchanger 200, with FIG. 3 showing an isometric view, FIG. 4 showing a top plan view and FIG. 5 showing a bottom plan view of the heat exchanger 200.

Figure 6:
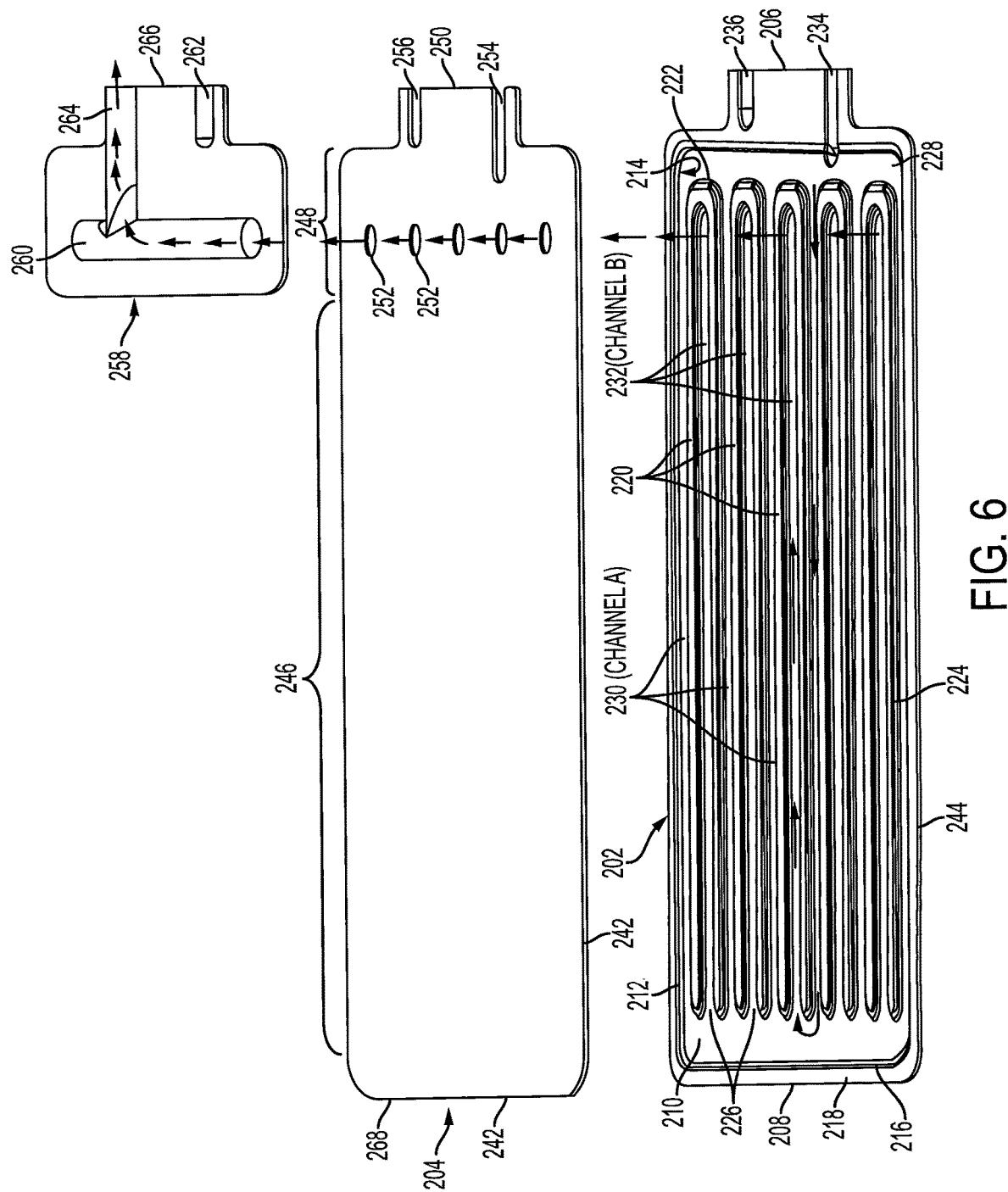
FIG. 6 is an exploded side view of a first embodiment of a battery cell heat exchanger in accordance with specification.
Figure 7:
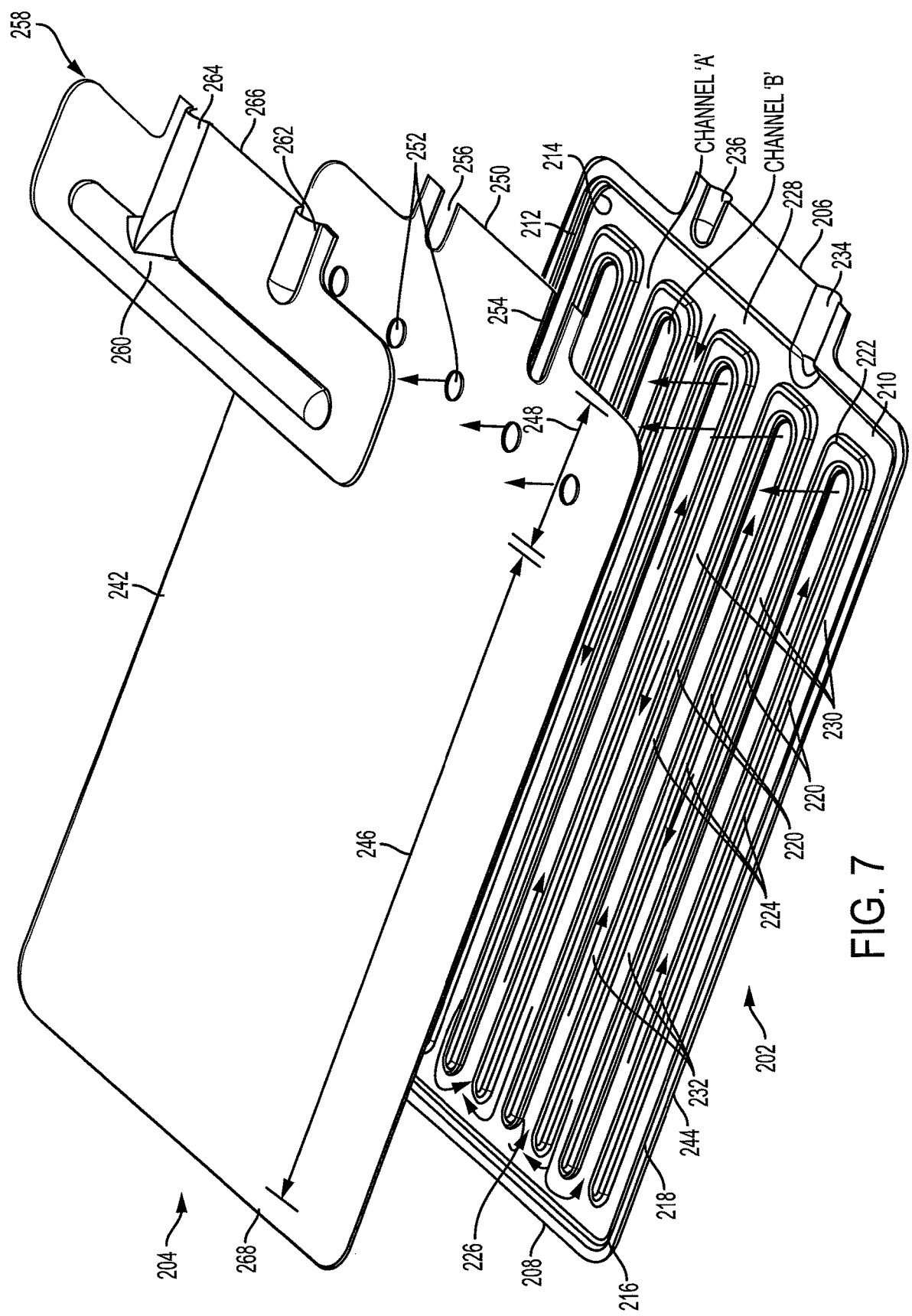
FIG. 7 is an exploded top isometric view of a first embodiment of a battery cell heat exchanger in accordance with specification.
Figure 8:
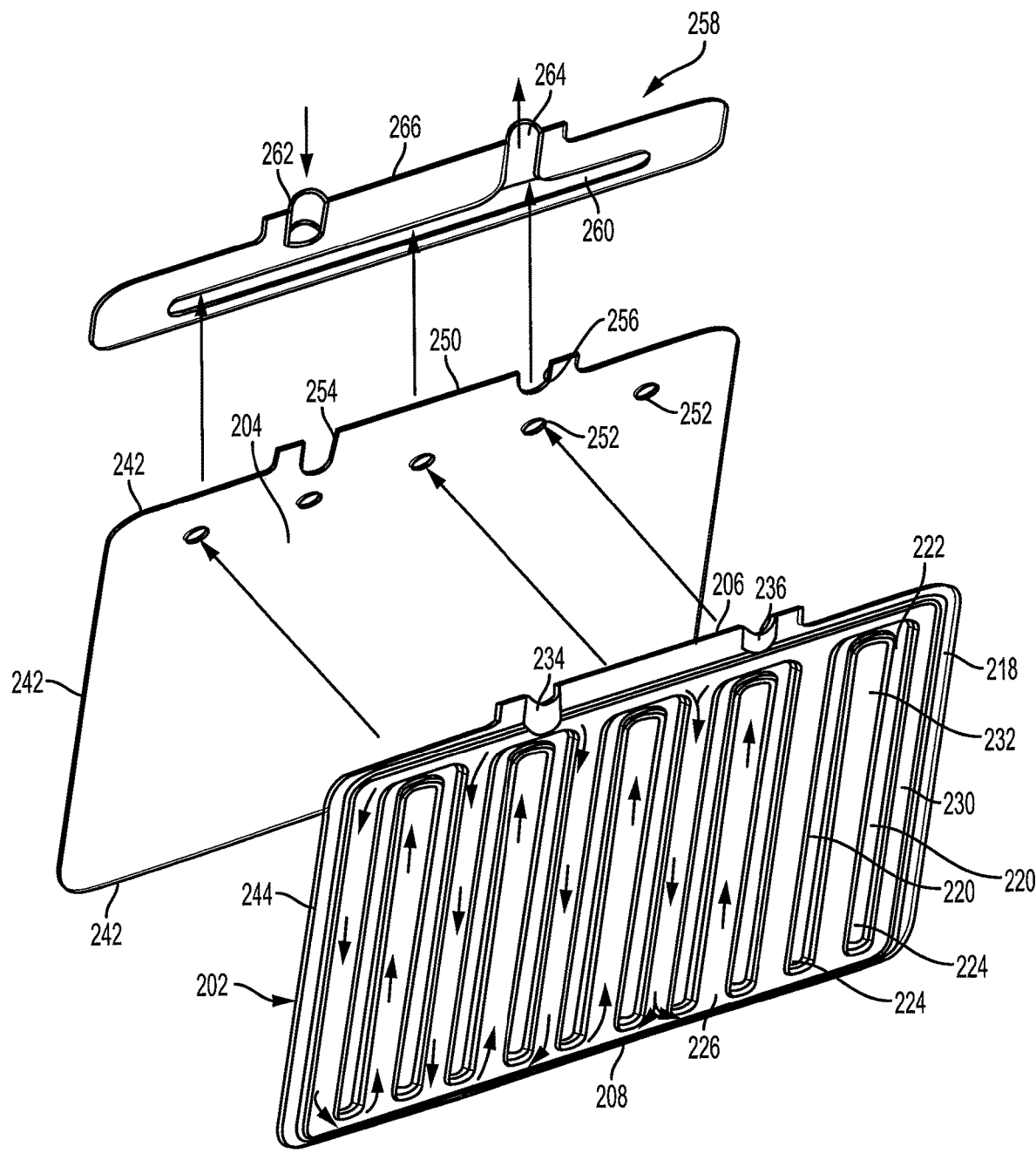
FIG. 8 is an exploded bottom isometric view of a first embodiment of a battery cell heat exchanger in accordance with specification.
Figure 9:
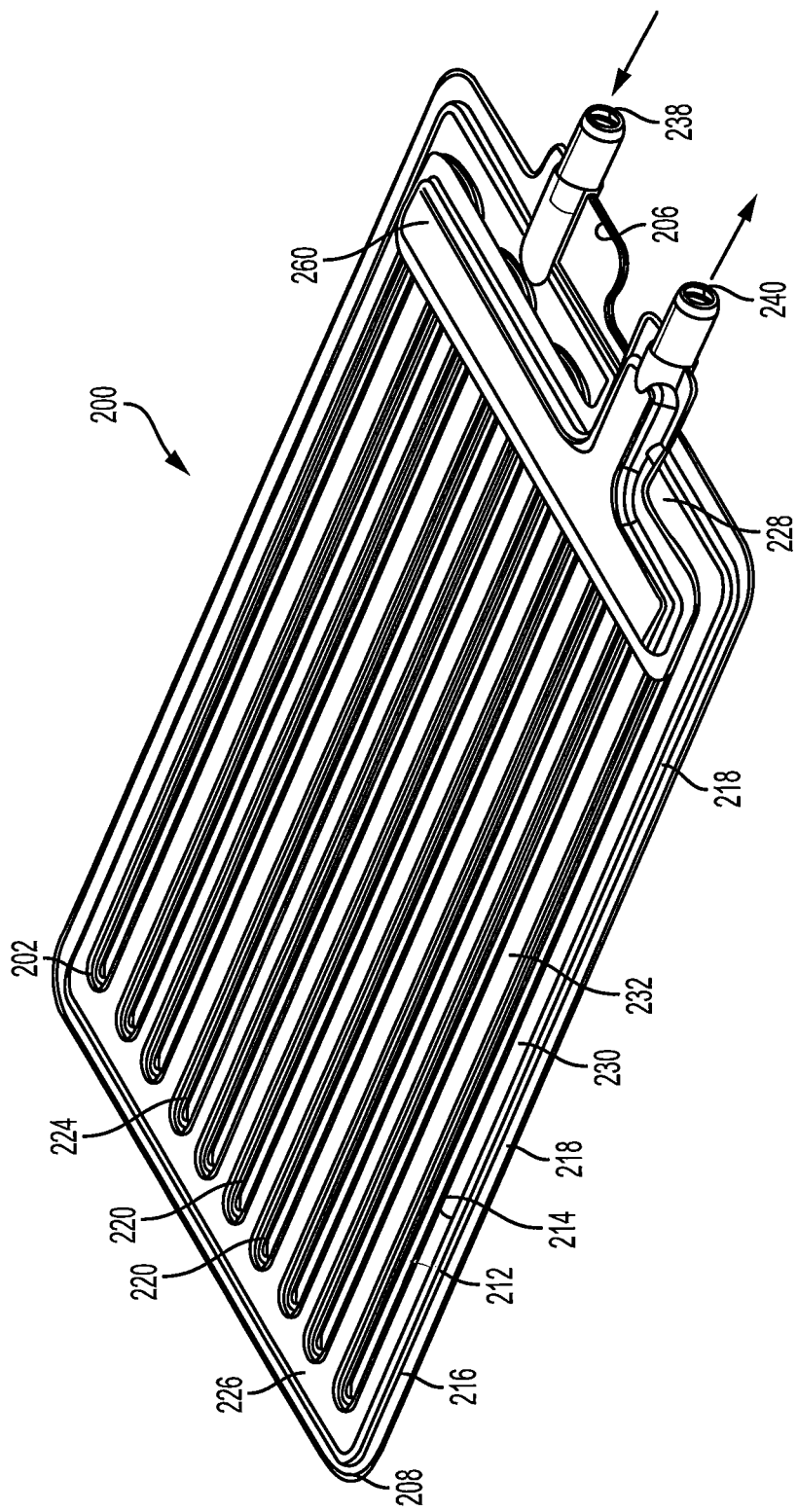
FIG. 9 shows a bottom view of a second embodiment of a battery cell heat exchanger in accordance with specification.
Figure 10:
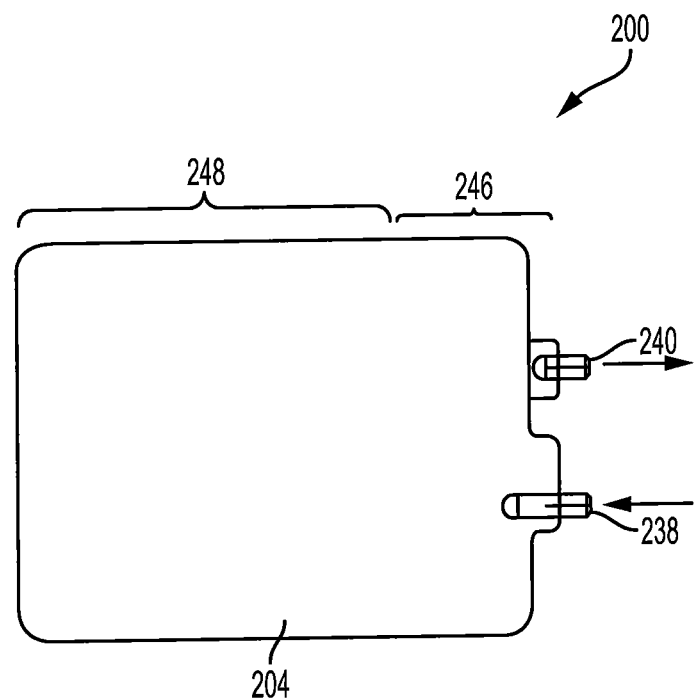
FIG. 10 shows a top plan view of a second embodiment of a battery cell heat exchanger in accordance with specification.

As shown in FIGS. 6-8, the heat exchanger 200 is made up of a first plate 202 and a second plate 204 (FIG. 6-8). In the embodiment shown in FIGS. 3-8, the first plate 202 can also be described as a ribbed-plate and the second plate 204 can also be described as a cover plate. Although the heat exchanger 200 and the first and second heat exchanger plates 202, 204 are shown as rectangular in shape, as should be recognized by a person of skill in the art, the shape is exemplary only and not particularly limited, and can be varied depending upon design and application requirements.

In the embodiment shown in FIGS. 3-8, the first plate 202 (or ribbed plate) is generally in the form of an upside-down, dished-plate. The first plate 202 of the heat exchanger 200 has a first end 206 (also noted as, first plate first end) and a second end 208 (also noted as, first plate second end) that is opposite to the first end 206 of the first plate 202. The first plate 202 has a central generally planar portion 210 formed between the first end 206 and second end 208 of the first plate 202. A peripheral wall 212 extends from the edge of the central planar portion 210 in a first direction towards the second plate 204. In other words, the central planar portion 210 is attached to a first end 214 (also noted as, peripheral wall first end) of the peripheral wall 212. On the second end 216 (also noted as, peripheral wall second end), a peripheral flange 218 is attached that extends outwardly and away from the central planar portion 210. Therefore, the central planar portion 210 is located below the plane of a peripheral flange 218 (as shown in FIGS. 6 and 7).

The central planar portion 210 of the first plate 202 is provided with a plurality of spaced-apart generally U-shaped ribs 220. The U-shaped ribs are positioned so that they are also spaced-apart from the peripheral wall 212 that extends from the central planar portion 210. In addition, as shown in FIGS. 5-8, the base 222 of the U-shaped ribs 220 is proximate to the first end 206 of the first plate 202, with the arms 224 of the U-shaped ribs 220 extending towards the second end 208 of the first plate 202. In other words, the open end 226 of the U-shaped ribs 220 is proximate to the first plate second end 208, with the base 222 being proximate to the first plate first end 206.

The U-shaped ribs 220 extend in the same direction (the first direction) as the peripheral wall 212, with the base 222 and the arms 224 of the U-shaped ribs 220 being provided with flat top surfaces that are co-planar with the flange 218. This allows the flange 218 and the flat top surfaces of the U-shaped ribs provide contact surfaces or brazing surfaces for surface-to-surface contact with the second plate 204 when the first plate 202 and second plate 204 are brazed or otherwise sealed together. In addition, brazing or sealing of the first plate 202 and second plate 204, along with the U-shaped ribs 220 provides fluid channels to attain the counter-flow, as described herein.

As the base 222 of the U-shaped ribs 220 is spaced-apart from the peripheral wall 212 close to the first end 206 of the first plate 202, a first manifold region 228 is provided that permits fluid flow from the first end 206 towards the second end 208 of the first plate 202. Due to the presence and positioning of the U-shaped ribs 220, with the base 222 being closer to the first end 206, fluid can flow only in between two adjacent U-shaped ribs 220, or in between the peripheral wall 212 and the U-shaped rib 220 adjacent to it. This provides a first channel 230 (labeled as 'Channel A') where the fluid flows away from the first manifold region 228.

Once the fluid reaches the peripheral wall 212 close to the second end 208 of the first plate 202, it turns and enters the open-end 226 of the U-shaped ribs 220 and travels towards the first end 206 of the first plate 202. Thus, the passage between the two arms 224 of each U-shaped rib 220 provides a second channel 232 (labeled as 'Channel B'), where the flow of the fluid is in an opposite direction (counter-flow) to the flow of the fluid in the first channel 230 (channel 'A'). The fluid flow is further illustrated using arrows in FIGS. 6 and 7.

As should be recognized by a person of skill in the art, the shape and size of the U-shaped ribs 220 is not particularly limited and can be varied based on design and application requirements. In one embodiment, for example and without limitation, the U-shaped ribs 220 can be modified such that the arms 224 extending outwardly and away from each other (rather than being parallel as shown in the figures), and could be considered closer to a V-shaped rib (not shown).

As shown in FIGS. 6-8, the first plate 206 is provided with a first indentation 234 and a second indentation 236. When the heat exchanger 200 is assembled, the first indentation 234 and the second indentation 236 with the other plates of the heat exchanger 200 form the inlet 238 and outlet 240 (FIGS. 3-5), as described herein. As should be recognized by a person of skill in the art, the assignment of inlet 238 and outlet 240 herein is exemplary only for purposes of illustration, and the inlet 238 and outlet 240 can be reversed based on design and application requirements.

The first and second indentations 234, 236 (FIGS. 6-8) extend in a direction opposite to the U-shaped ribs 220 (i.e. in a second direction); in other words, the indentations 234, 236 formed extend from the peripheral flange 218 in a direction towards the plane having the central planar portion 210.

In the embodiment shown in FIGS. 3-8, the first indentation 234 is formed from the first end 206 of the first plate 202 and extends all the way over the flange 218 proximate the first end 206 and ends in the central planar portion 210 of the first plate 202. Thus, fluid that enters through the first indentation 234 (or inlet 238) passes to the first manifold region 228, and from there it enters into first channels (channels 'A') 230 for flow towards the second end 208 of the first plate 202.

As shown in the embodiment in FIGS. 3-8, the second indentation 236 is also formed at the first end 206 of the first plate 202, and extends from the first end 206 to the peripheral flange 218 at the first end 206, without extending to the peripheral wall 212 or central planar portion 210 of the first plate 202. As described further herein, by ending the second indentation 236 in the peripheral flange 218 portion of the first plate 202, fluid in the second indentation 236 is prevented from entering the first manifold region 228, and can help with preventing mixing of the fluid that enters the heat exchanger 200 and the fluid that exits the heat exchanger 200.

As described herein, the heat exchanger 200 (shown in FIGS. 3-8) is also provided with a second plate 204 (or cover plate). The second plate 204 is sized to be similar to the first plate 202, so when the first plate 202 and second plate 204 are brought together for sealing or brazing, the edges 242 of the second plate 204 align with edges 244 of the flange 218, for forming the plate pair.

The second plate 204 has a first, generally planar region 246 upon which the individual battery cell containers 12 are stacked when the heat exchanger 200 (or 10 in FIGS. 1 and 2) is arranged with the battery unit 100, similar to the arrangement shown in FIGS. 1 and 2. The first region 246 of the second plate 204 defines the primary heat transfer surface 13 of the heat exchanger 200. The second plate 204 also includes a second generally planar region 248 formed close to a first end 250 of the second plate 204 (as noted as 'second plate first end'), adjacent to the first planar region 246, which is also referred herein as 'second plate manifold region 248'. In the illustrated embodiment, both the first and second region 246, 248 of the second plate 204 are flat and planar, such that the entire second plate 204 (cover plate) is flat and planar.

The second plate manifold region 248 having a plurality of apertures 252 arranged at spaced-apart intervals across the width of the second plate 204. The width being transverse to the longitudinal axis that extends from the first end 206 to the second end 208 of the first plate 202, and is parallel to the edges of the heat exchanger 200.

As shown in FIGS. 6-8, the plurality of apertures 252 are formed and aligned to permit the fluid flowing in channels 'B' 232 to flow through the apertures 252 (as shown by the arrows). Although the position of the apertures 252 are not particularly limited, it is preferable to position the apertures 252 such that the fluid flowing in channels 'B' 232 are permitted to flow the entire length of channel 'B' 232. In other words, as the fluid gets close to the base 222 of the U-shaped ribs 220, if flows from the channel 'B' 232 into the apertures 252 to exit the heat exchanger, as disclosed herein.

The first end 250 of the second plate 204 (second plate first end) has a first slit 254 and second slit 256 formed therein. As shown FIGS. 6-8, the edge of the second plate 204 that defines the first slit 254 generally aligns with the edge of the first indentation 234 formed in the first plate 202.

Therefore, the first slit 254 is formed to extend from the first edge 250 of the second plate 204 (second plate first edge) to the second plate manifold region 248. This can help to allow fluid entering the heat exchanger 200 through the inlet 238 to flow into the first manifold region 228 of the first plate 202.

The second slit 256 formed in the second plate 204 is shorter than the first slit 254, such that the edge of the second plate 204 that defines the second slit 256 generally aligns with the edge of the second indentation 236 formed in the first plate 202. When the first plate 202 and the second plate 204 are brought together for brazing or sealing together, the edges of the second plate 204 that define the second slit 256 contact and seal with the flat surface of the flange 218 near the first end 206 of the first plate 202. This can help prevent fluid present in the first manifold region 228 of the first plate 202 to flow into the second indentation 236 and exit the heat exchanger 200.

As shown in FIGS. 6-8, the heat exchanger 200 is also provided with a third plate 258 (also noted as a 'channel plate'), which is generally flat planar plate. Although the third plate 258 shown in FIGS. 3-8 is present only in the manifold region 248 of the second plate 204, the length of the third plate 258 can be varied depending upon design and application requirements.

The third plate 258 has a duct or groove 260 formed therein that protrudes in a first direction (the same direction as the U-shaped ribs 220 extend from the central planar portion 210 of the first plate 202). In addition, the duct or groove 260 is aligned to be in fluid communication with the apertures 252, allowing fluid from channel 'B' in the first plate 202 to flow through the apertures 252 and enter into the duct or groove 260.

The third plate 258 has a first indentation 262 (also noted as third plate first indentation) and a second indentation 264 (also noted as third plate second indentation). The third plate first indentation 262 and the third plate second indentation 264 both extend in the first direction (same as the duct or groove 260), and opposite to the direction of the first plate first indentation 234 and the first plate second indentation 236.

The third plate first indentation 262 extends from the first end 266 of the third plate 258 (also noted as 'third plate first end'), and ends so that the edges of the third plate first indentation 262 align with the edges of the second plate 204 that define the first slit 254. This also results in the edges of the third plate first indentation 262 aligning with the edges of first plate first indentation 234, such that, when the first, second and third plates 202, 204 and 258 are brought together for sealing, the first plate first indentation 234 together with the third plate first indentation 262 form the inlet 238 of the heat exchanger 200, permitting fluid to flow into the first manifold region 228 in the first plate 202.

The third plate second indentation 264 extends from the first end 266 of the third plate 258 (also noted as 'third plate first end') to the duct or groove 260, and is in fluid communication with the duct or groove 260, permitting fluid to flow from the duct or groove 260 to the third plate second indentation 264. When the first, second and third plates 202, 204 and 258 of the heat exchanger 200 are brought together for sealing or brazing, the edges of the third plate second indentation align with longitudinal edges (that extend from the first end 250 to the second end 268) of the second plate 204 that define the second slit 256.

This alignment and positioning of the first, second and third plates 202, 204 and 258 results in the edges of the third plate second indentation 264 aligning with the edges of first plate second indentation 236, such that, when the first, second and third plates 202, 204 and 258 are brought together for sealing, the first plate second indentation 236 together with the third plate second indentation 264 form the outlet 240 of the heat exchanger 200, permitting fluid to flow from the channel 'B' through the aperture 252 into the duct or groove 260, and finally into the third plate second indentation 264 before exiting through the outlet 240 of the heat exchanger 200.

The position and length of the second slit 256 in the second plate 204 helps to prevent fluid flowing through the third plate second indentation 264 to flow back into the first manifold region 228 of the first plate 202. In addition, the set-up and structure of the first, second and third plates 202, 204 and 258 allows the inlet 238 and outlet 240 to be formed and extend in the plane defined by the heat exchanger 200.

FIGS. 9-13 disclose a second embodiment of a battery cell heat exchanger 200. Similar reference numerals have been used to denote similar components in the different embodiments disclosed herein.

The second embodiment of the battery cell heat exchanger 200 has a number of features similar to the battery cell heat exchanger 200 disclosed in FIGS. 3-8, as described herein. One difference, as described herein, is that the duct or groove 260 is formed and coupled on side of the heat exchanger 200 having the ribbed plate 202 (noted as the first plate 202 with respect to the first embodiment of the heat exchanger 200), while in the first embodiment disclosed in FIGS. 3-8, the duct or groove 260 is formed and coupled on side of the heat exchanger 200 having the flat plate 204 (noted as the second plate 204 with respect to the first embodiment of the heat exchanger 200).

The structure of the heat exchanger 200 shown in FIGS. 9-13 can help provide a larger flat surface (FIG. 10) upon which the individual battery cell containers 12 are stacked when the heat exchanger 200 (or 10 in FIGS. 1 and 2) is arranged with the battery unit 100, similar to the arrangement shown in FIGS. 1 and 2. Such an embodiment can be useful e-heating applications of the battery cell containers 12 as it can provide the additional footprint for positioning of the e-heaters (not shown). In the embodiment disclosed in FIGS. 9-13, the manifold that provides the conduit or duct is formed on the ribbed side of the heat exchanger, which is the side underneath the battery packs. This can provide an opportunity to add an e-heater (thick film heater), which can be located under the battery pack to minimize the risk of overheating the nearest battery cells (i.e., if the heater were on the top or flat side, it would be next to a battery cell); or to avoid consuming battery "payload" mounting space on the flat side. Furthermore, a sheet metal manifold on the ribbed side offers a relatively large flat surface area to apply a thick film heater.

Figure 11:
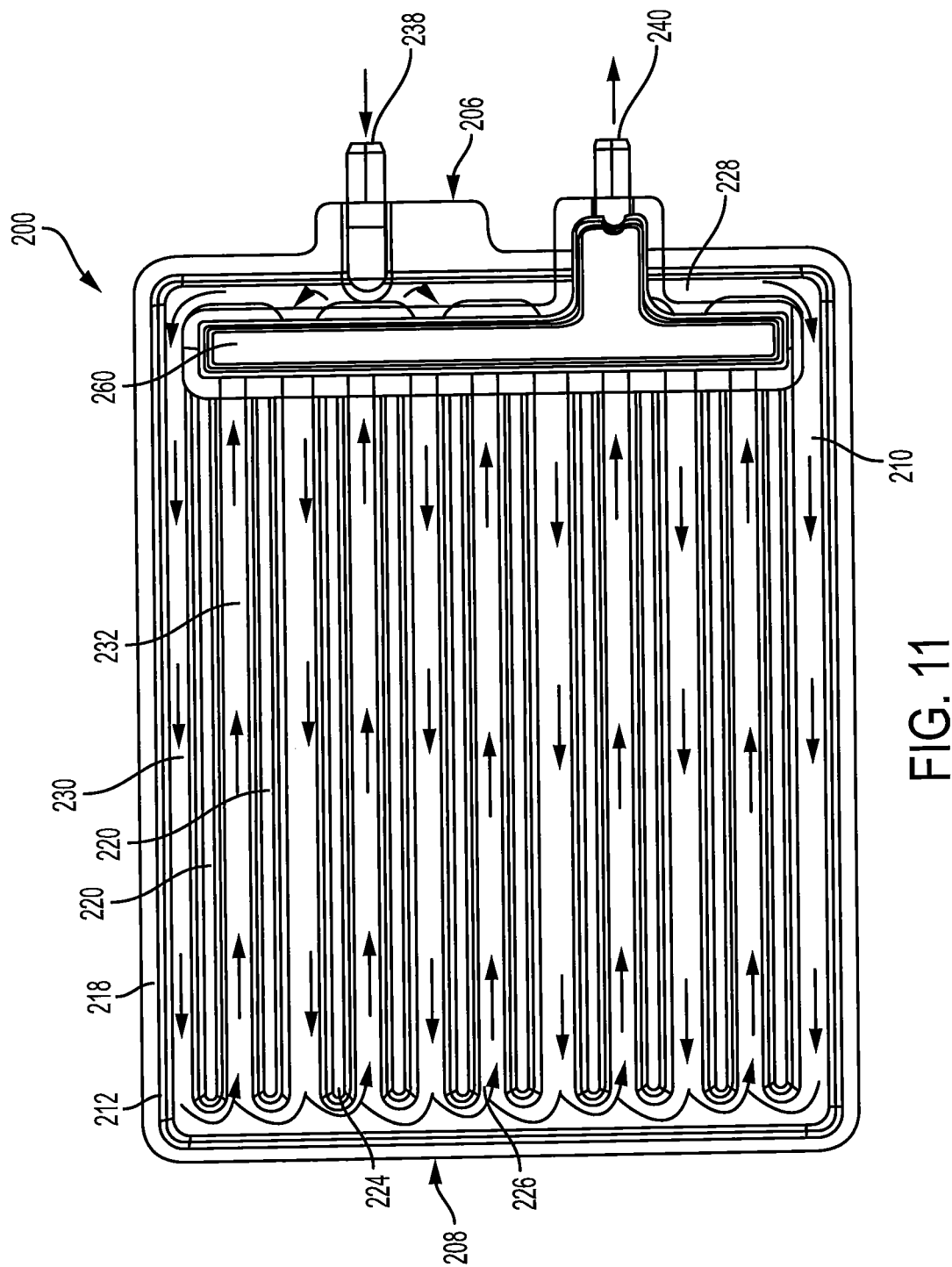
FIG. 11 shows a bottom plan view of a second embodiment of a battery cell heat exchanger in accordance with specification.
Figure 12:
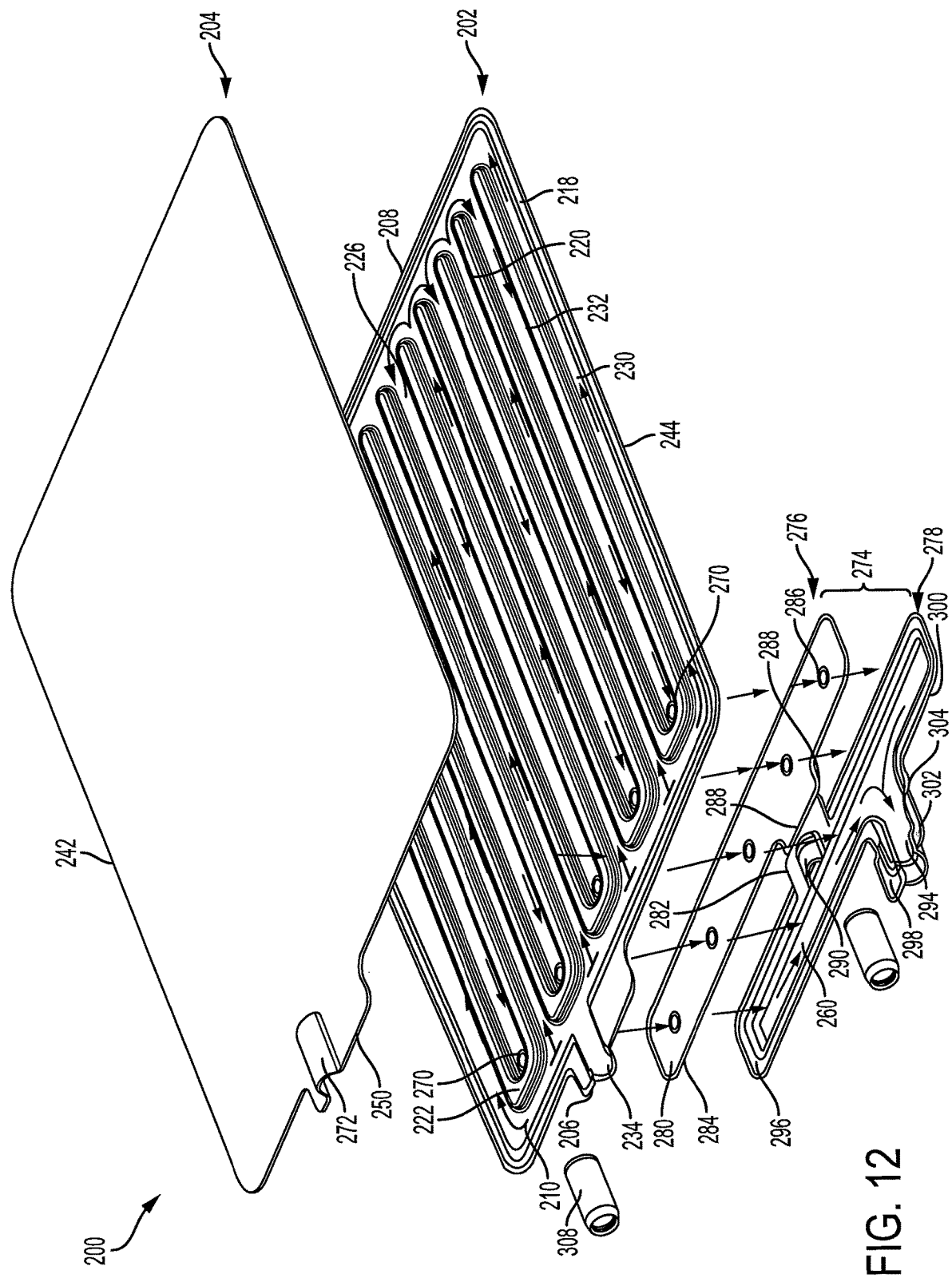
FIG. 12 is an exploded top perspective view of a second embodiment of a battery cell heat exchanger in accordance with specification.

FIGS. 12 (top perspective view) and 13 (bottom perspective view) show exploded of the second embodiment of the heat exchanger 200. In contrast to the heat exchanger 200 embodiment shown in FIGS. 3-8, which are made up of three main pieces (first plate 202, second plate 204 and third plate 258) and can be considered as a three-piece construction heat exchanger 200, the second embodiment heat exchanger 200 shown in FIGS. 9-13 are made-up of four main pieces, as described herein, and considered as a four-piece construction heat exchanger 200.

Figure 13:
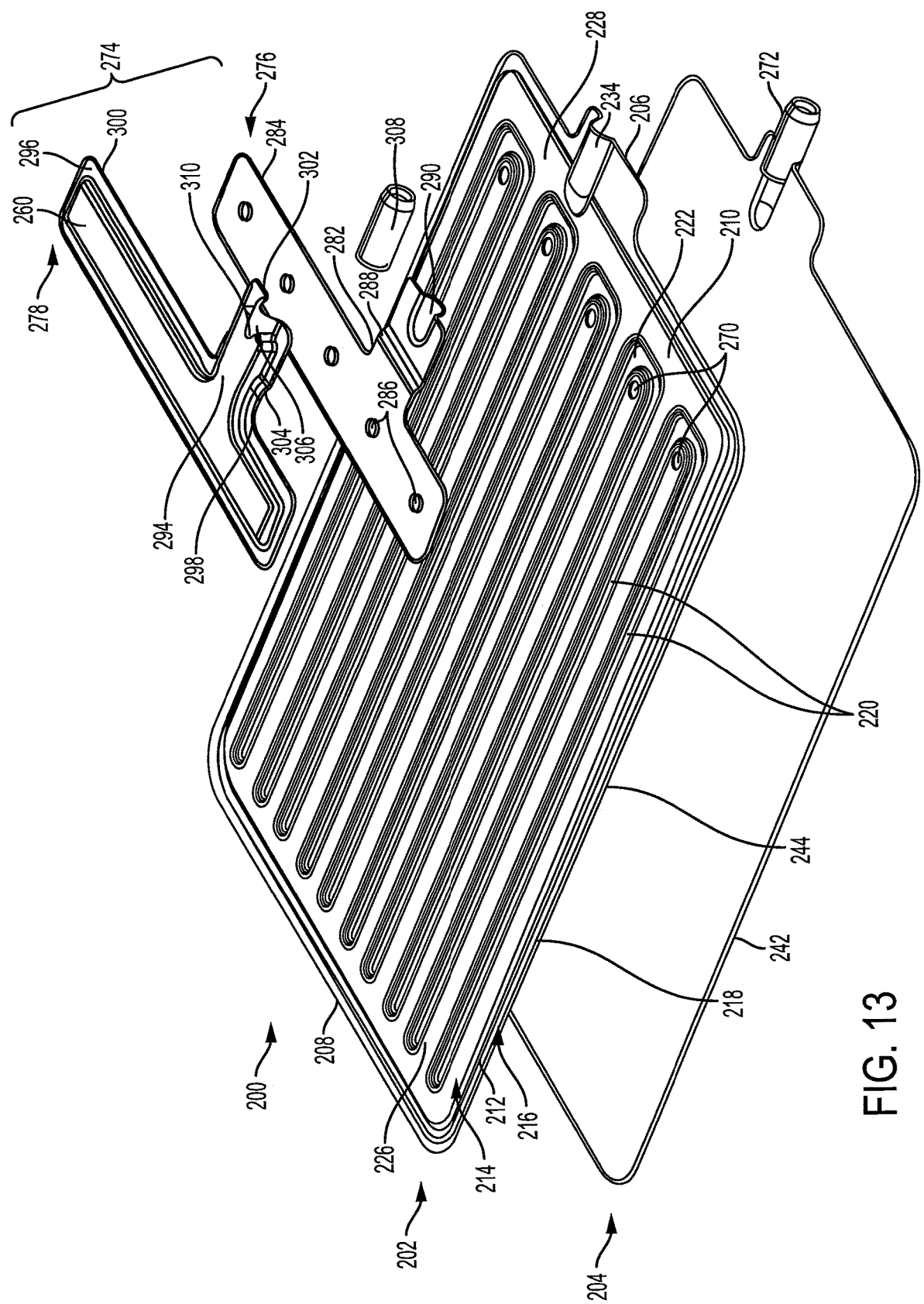
FIG. 13 is an exploded bottom perspective view of a second embodiment of a battery cell heat exchanger in accordance with specification.
Figure 14A:
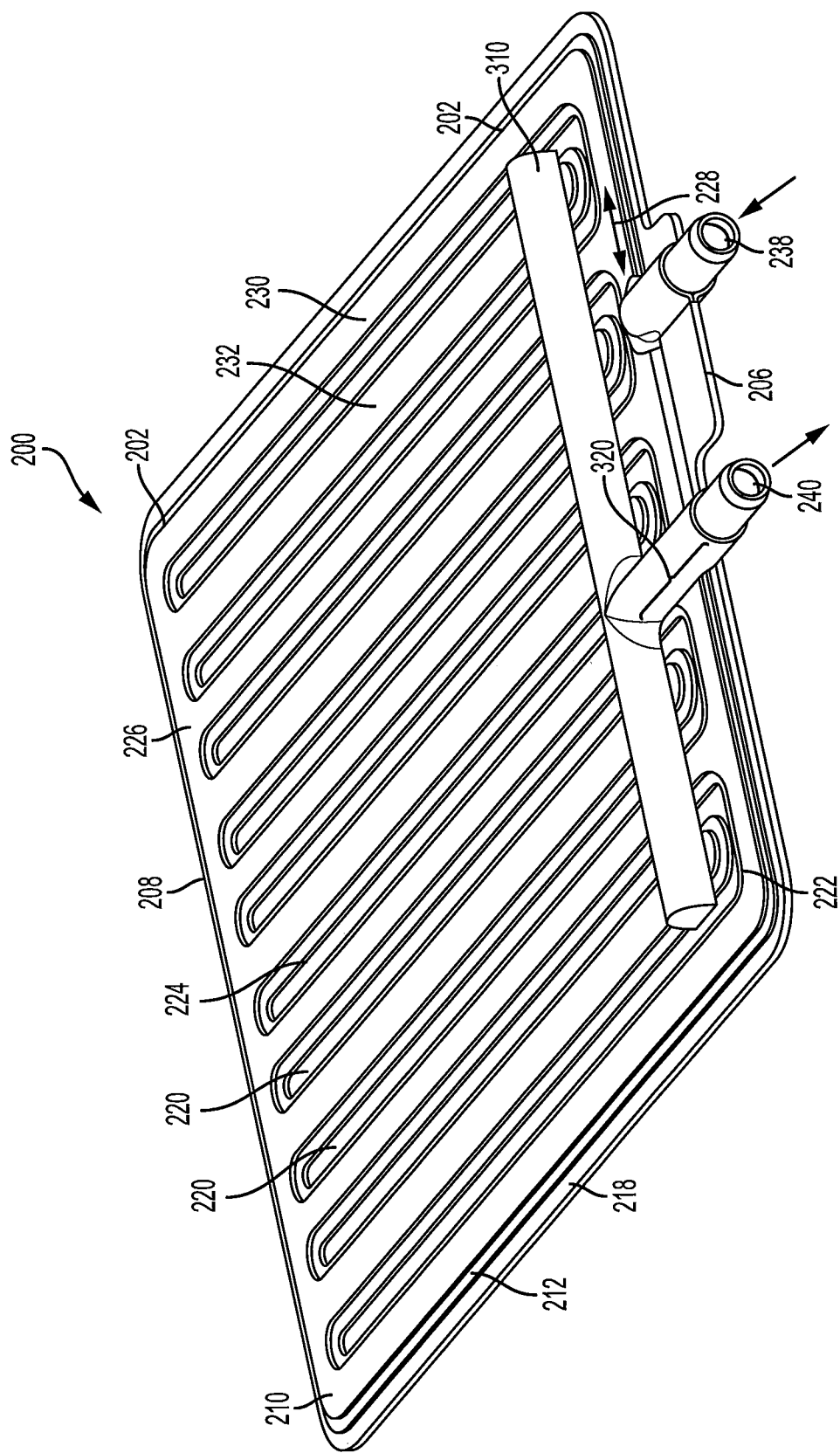
FIG. 14 (a & b) shows an isometric view of a third and fourth embodiment of a battery cell heat exchanger in accordance with specification.
Figure 14B:
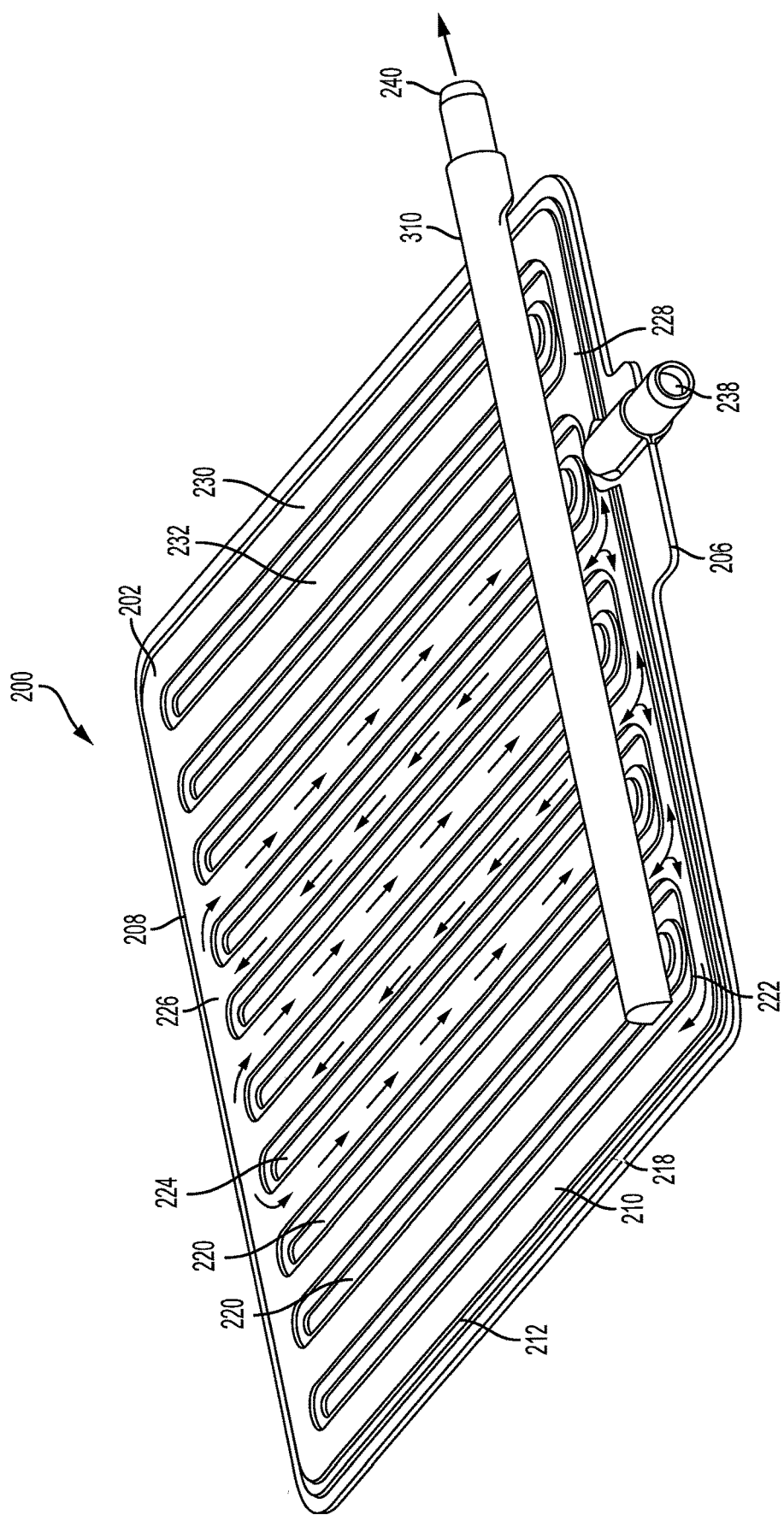
Figure 15A:
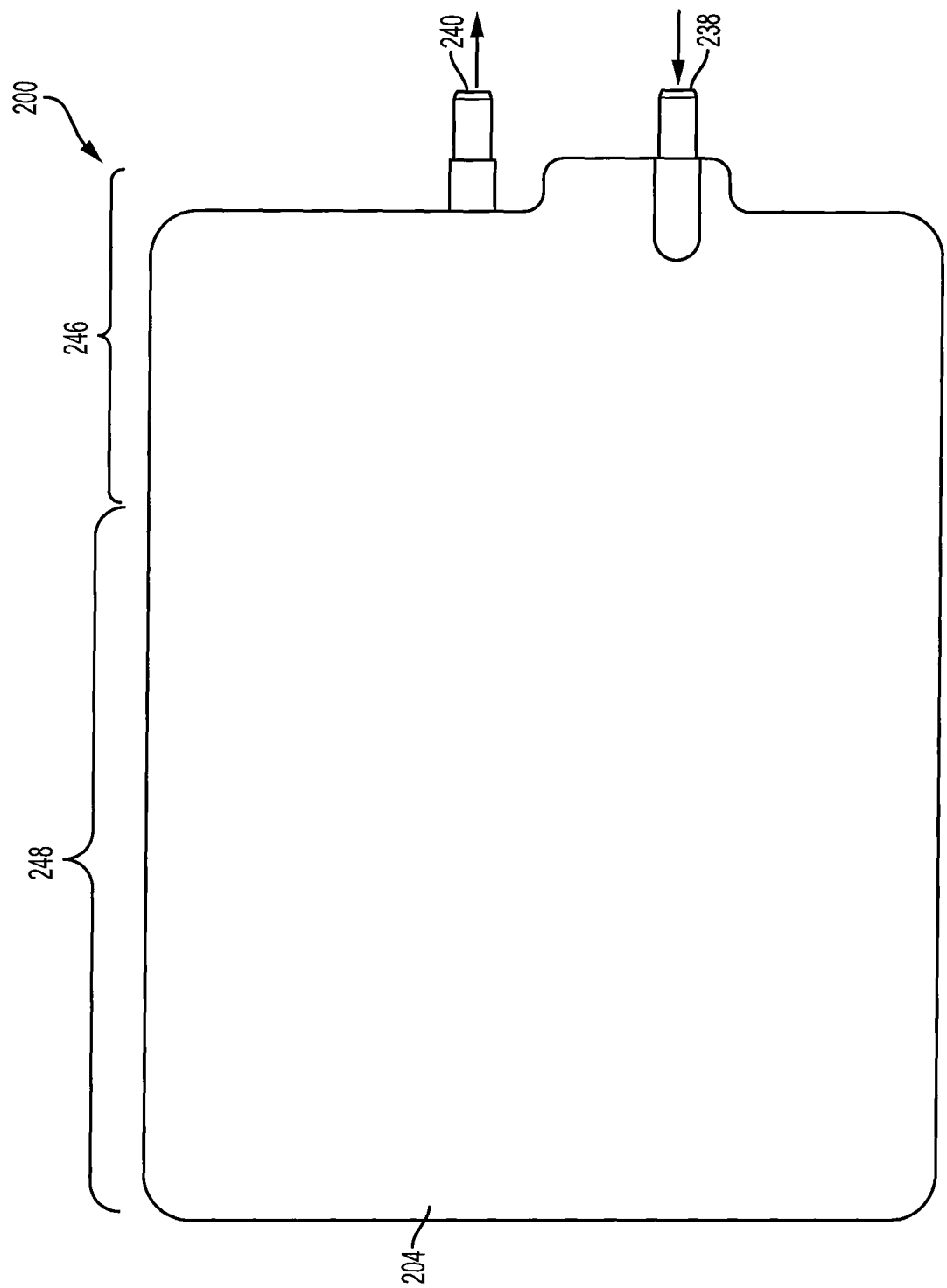
FIG. 15 (a & b) shows a top plan view of a third and fourth embodiment of a battery cell heat exchanger in accordance with specification.
Figure 15B:
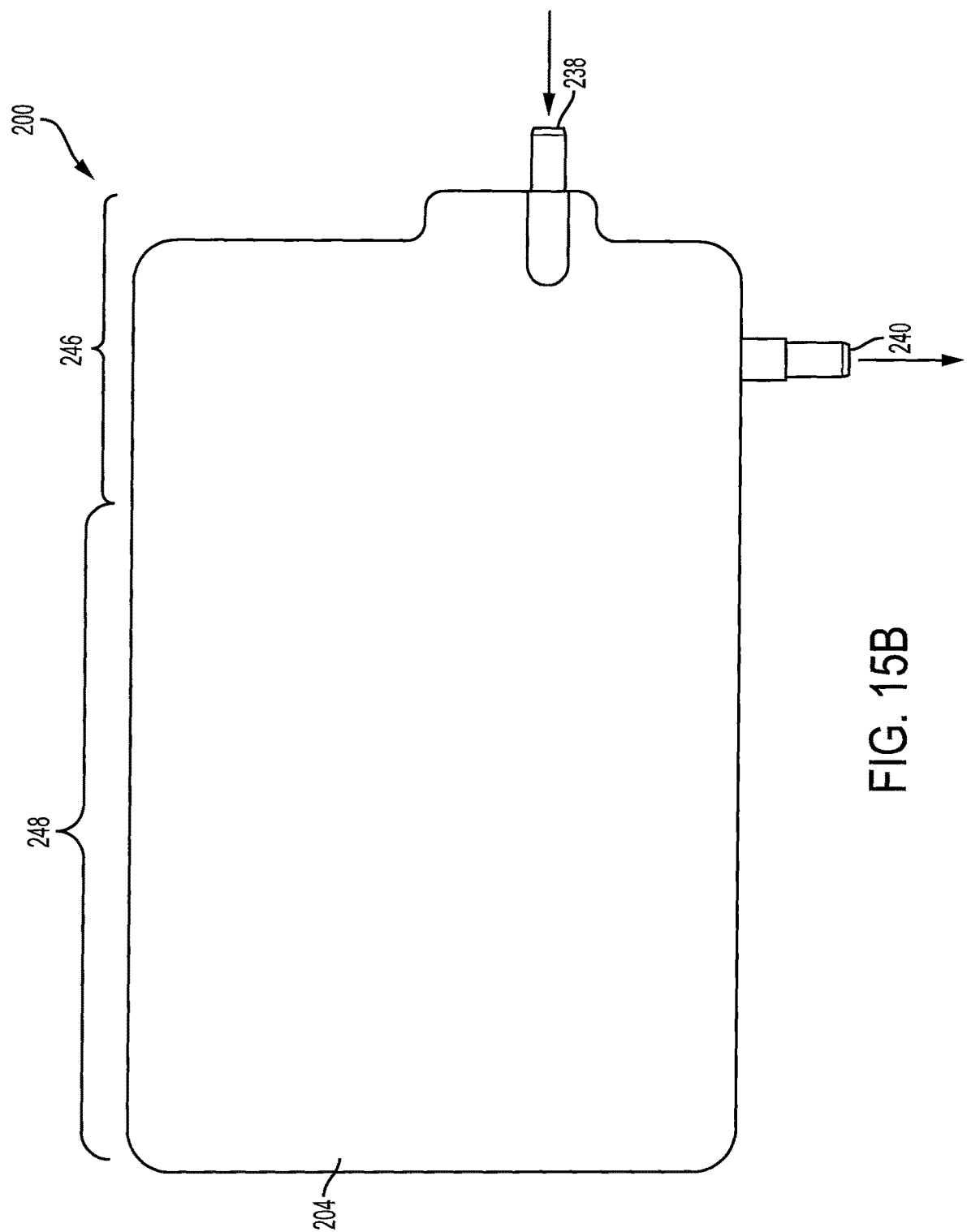
Figure 16A:
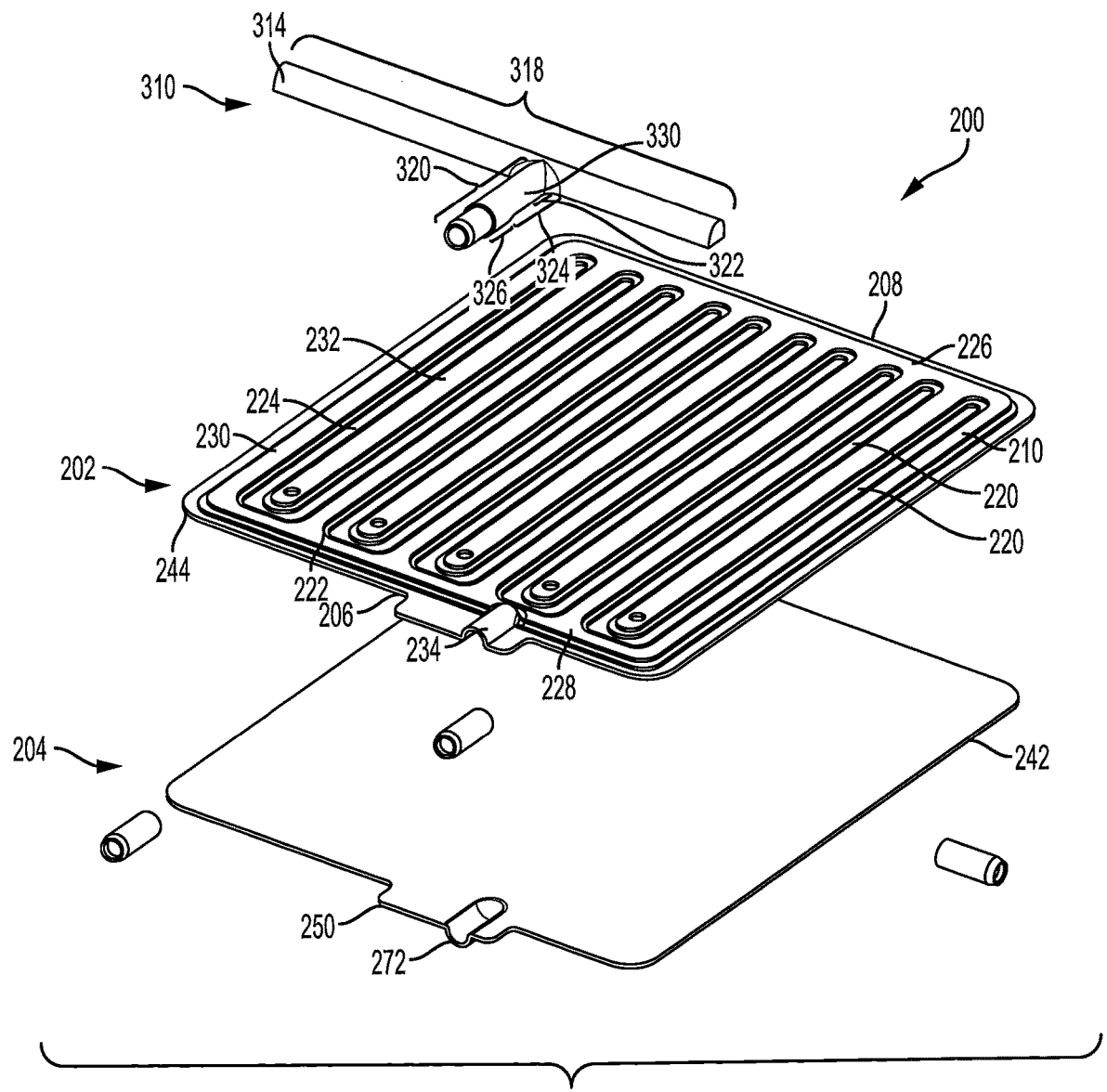
FIG. 16 (a & b) is an exploded top perspective view of a third and fourth embodiment of a battery cell heat exchanger in accordance with specification.
Figure 16B:
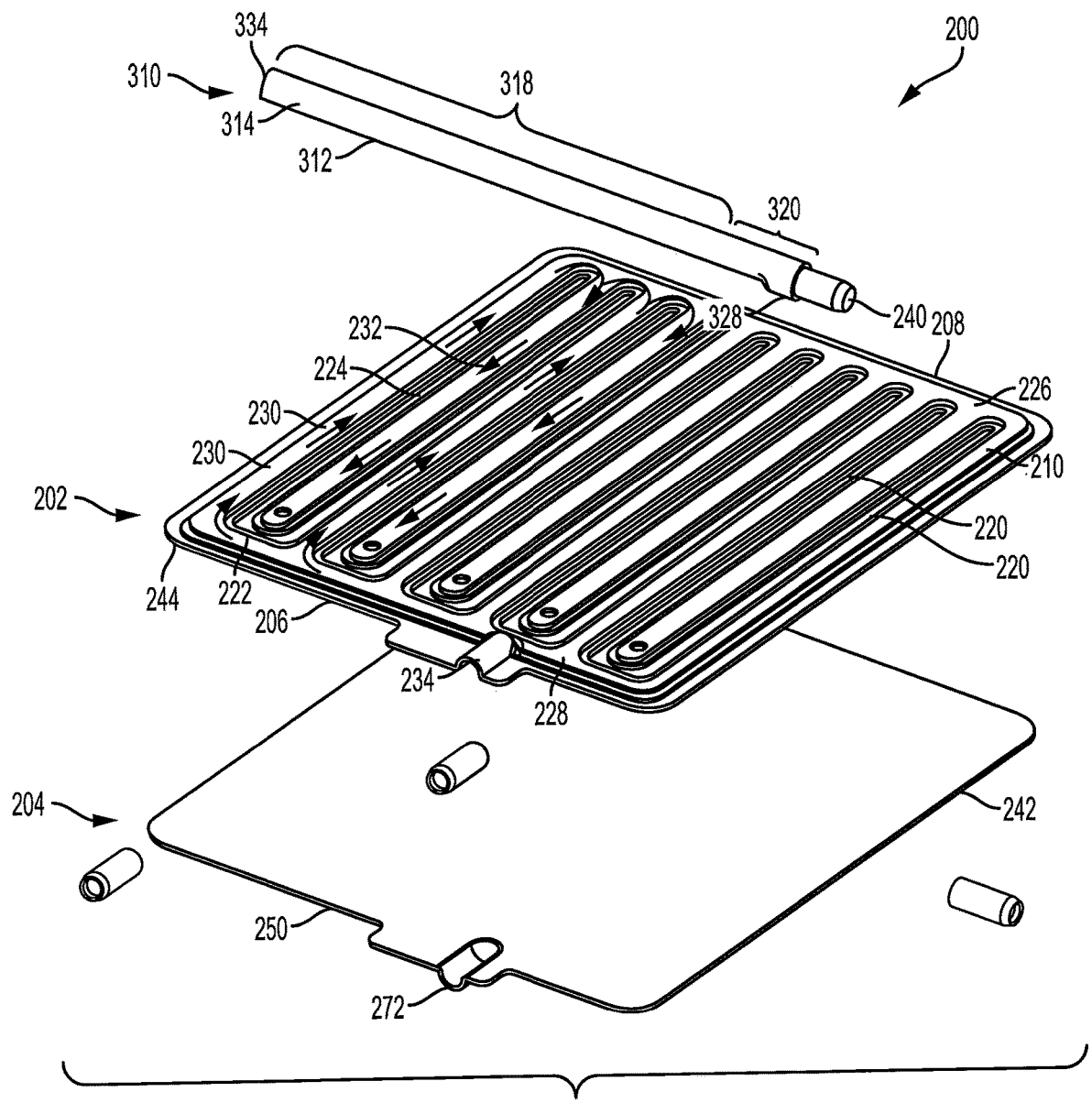
Figure 17A:
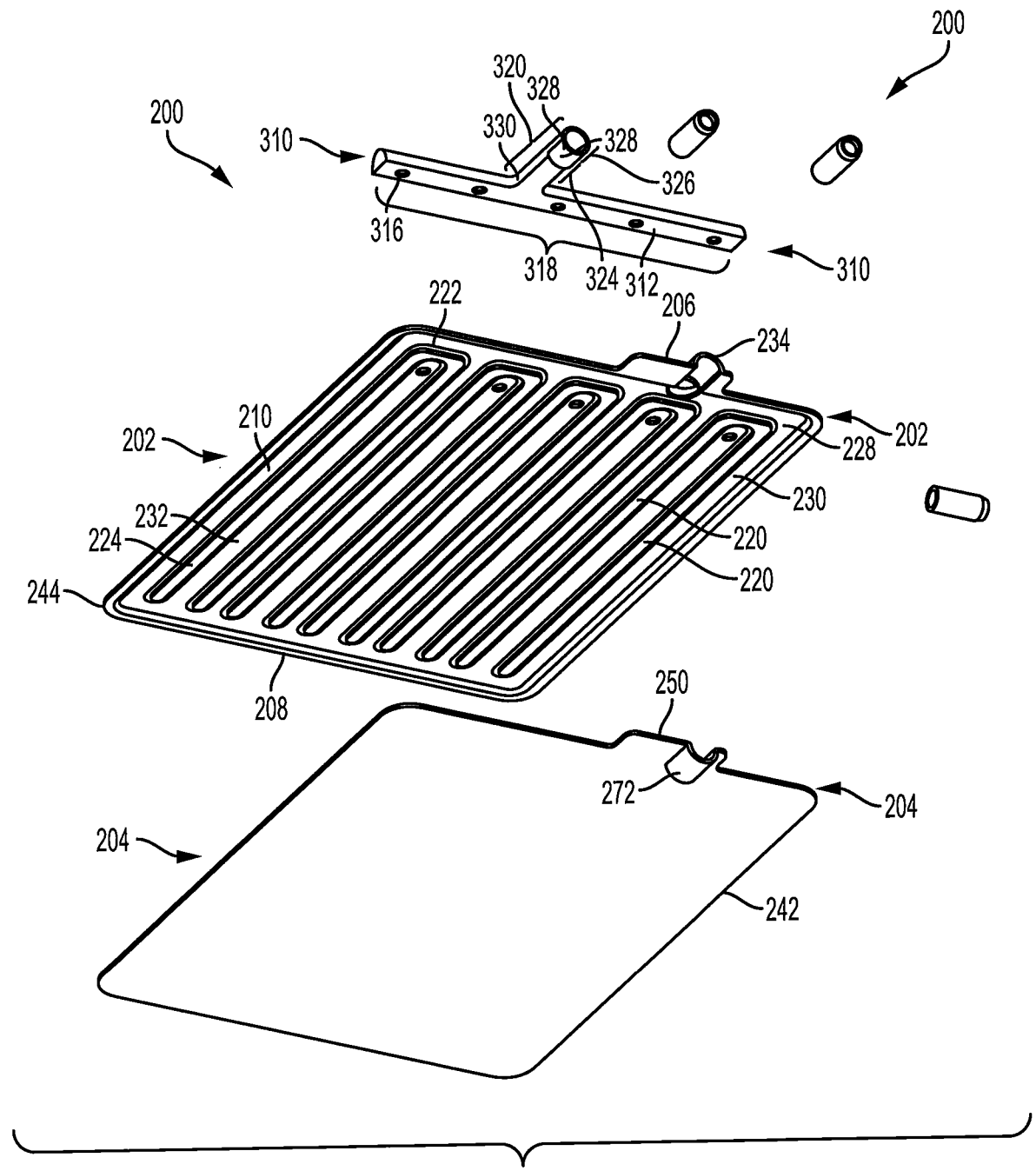
FIG. 17 (a & b) is an exploded bottom perspective view of a third and fourth embodiment of a battery cell heat exchanger in accordance with specification.
Figure 17B:
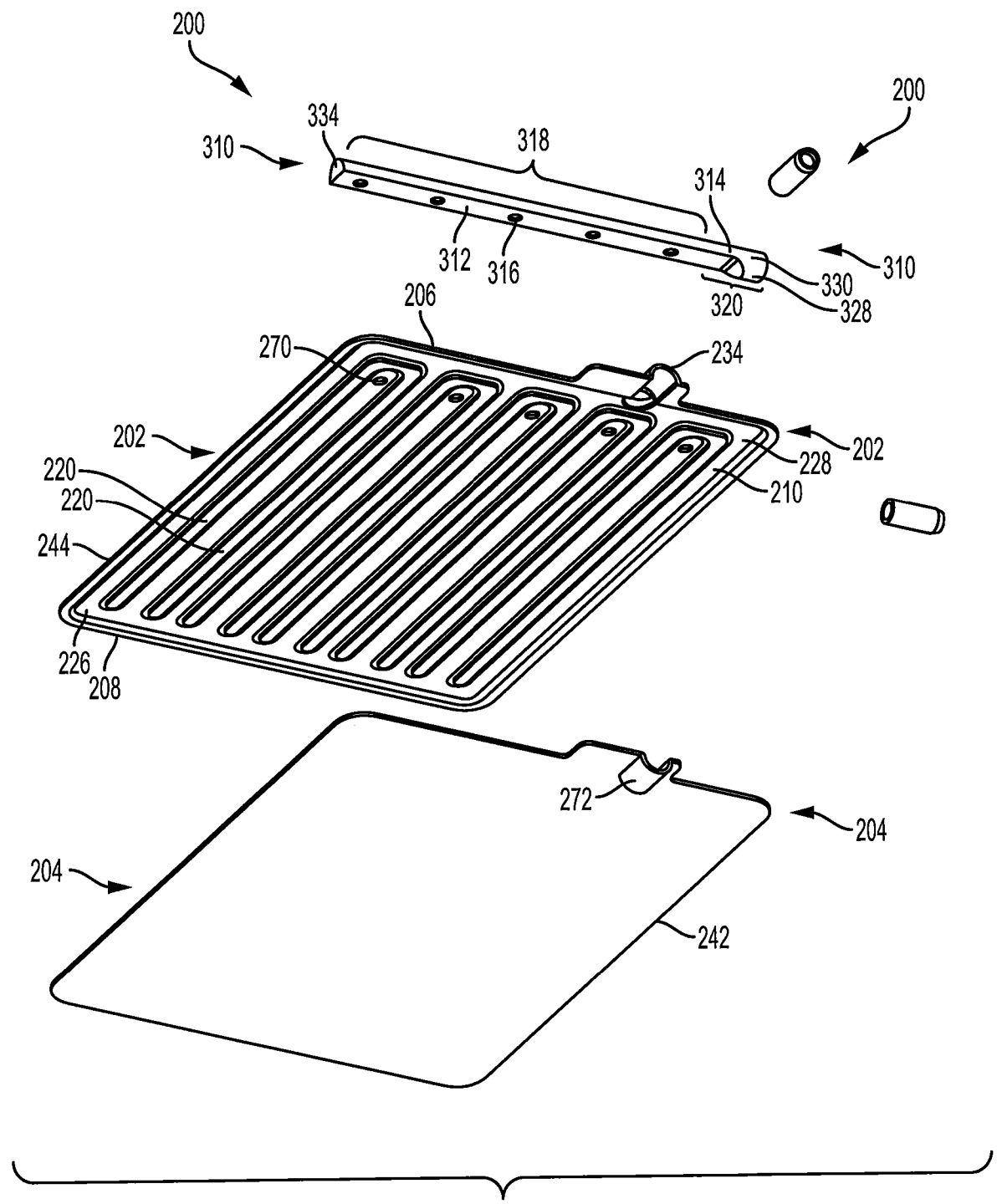
Figure 18A:
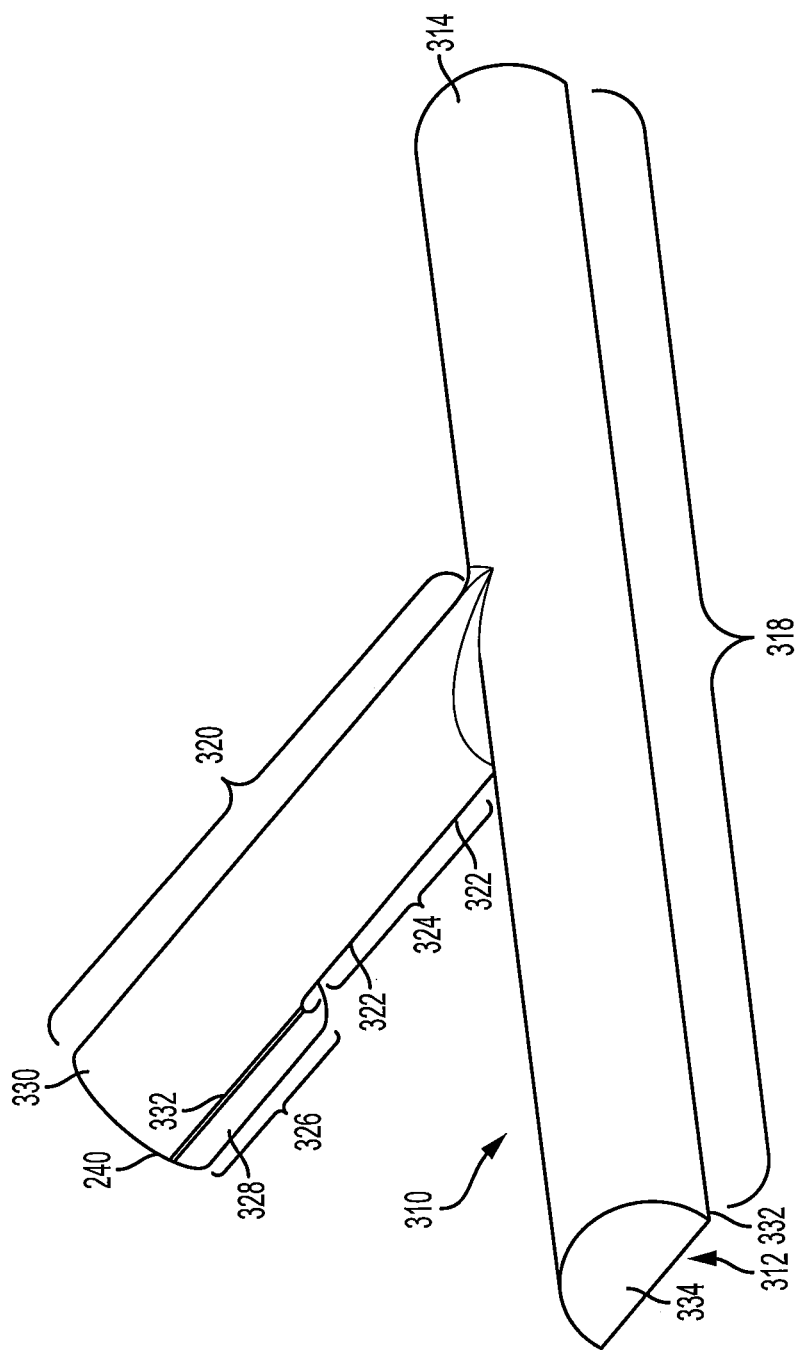
FIG. 18 (a & b) shows a top perspective view of the semi-circular tube for coupling to the third and fourth embodiment of the heat exchanger in accordance with specification.
Figure 18B:
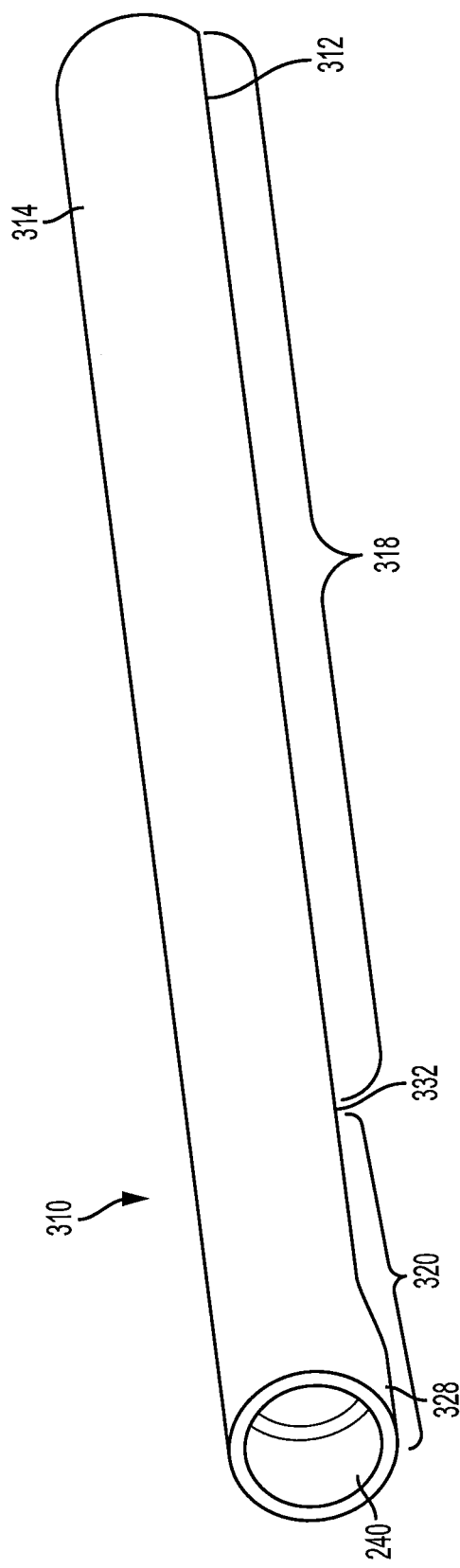
Figure 19A:
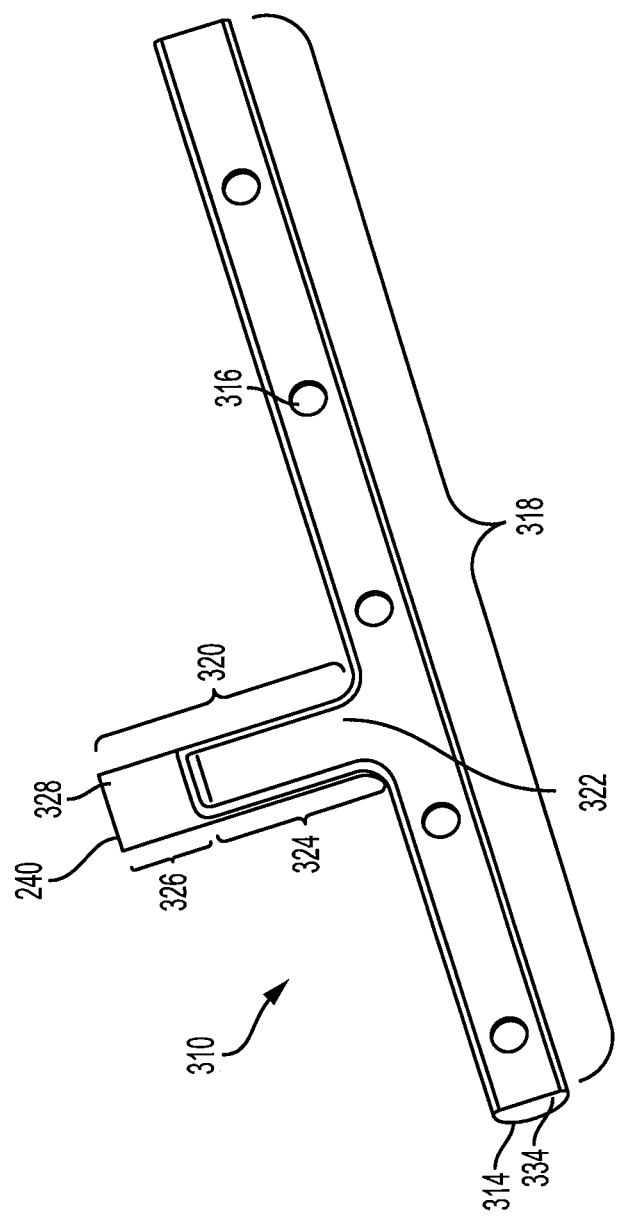
FIG. 19 (a & b) shows a bottom plan view of the semi-circular tube for coupling to the third and fourth embodiment of the heat exchanger in accordance with specification.
Figure 19B:
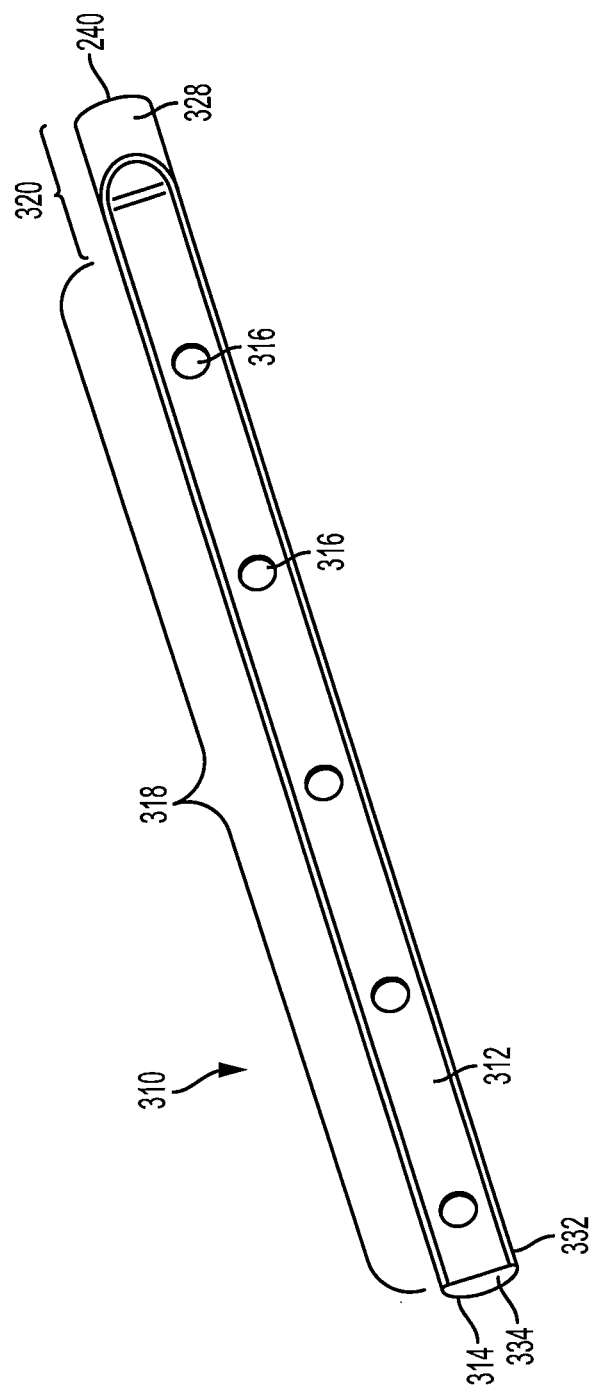
Figure 20A:
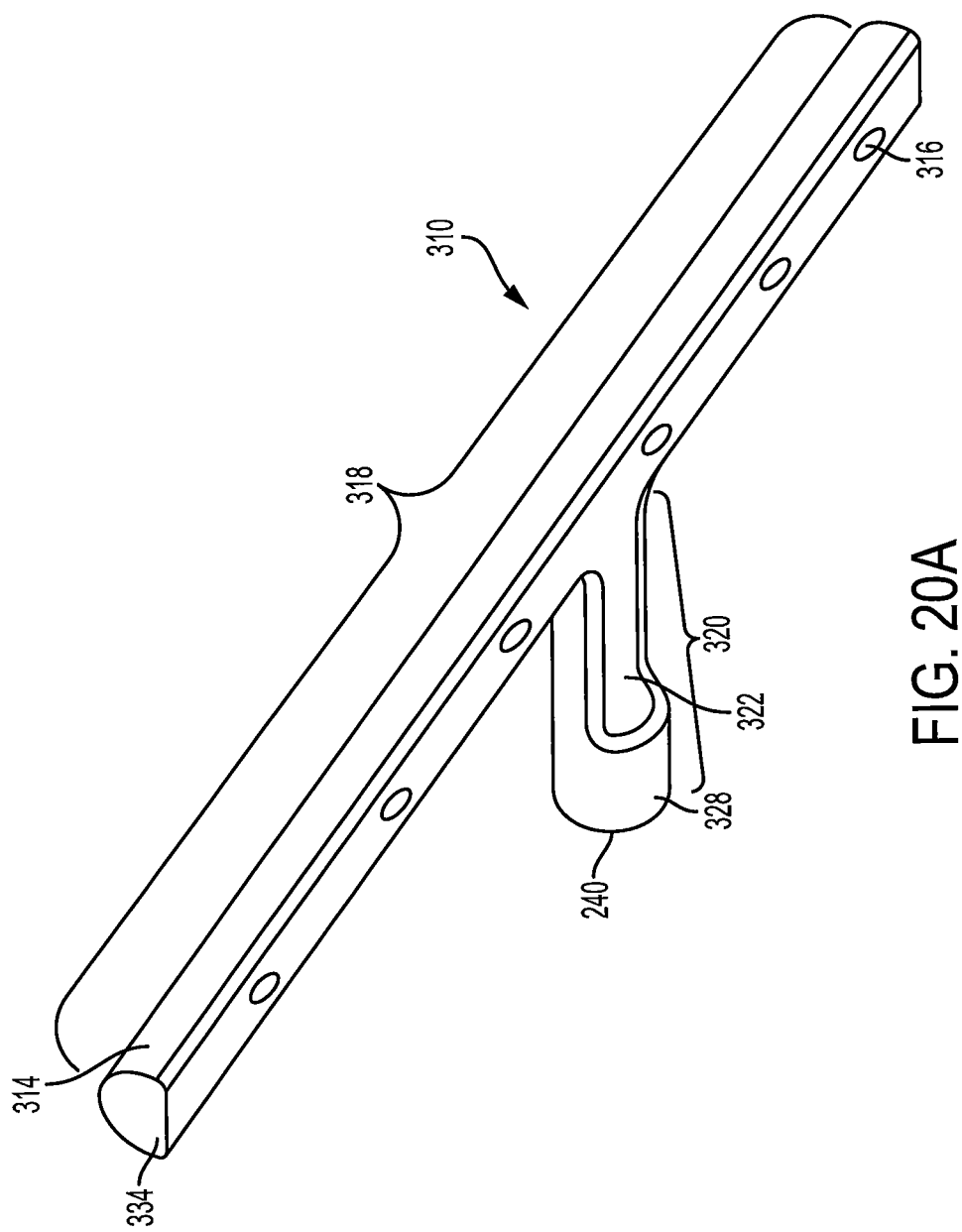
FIG. 20 (a & b) shows a back perspective view of the semi-circular tube for coupling to the third and fourth embodiment of the heat exchanger in accordance with specification.
Figure 20B:
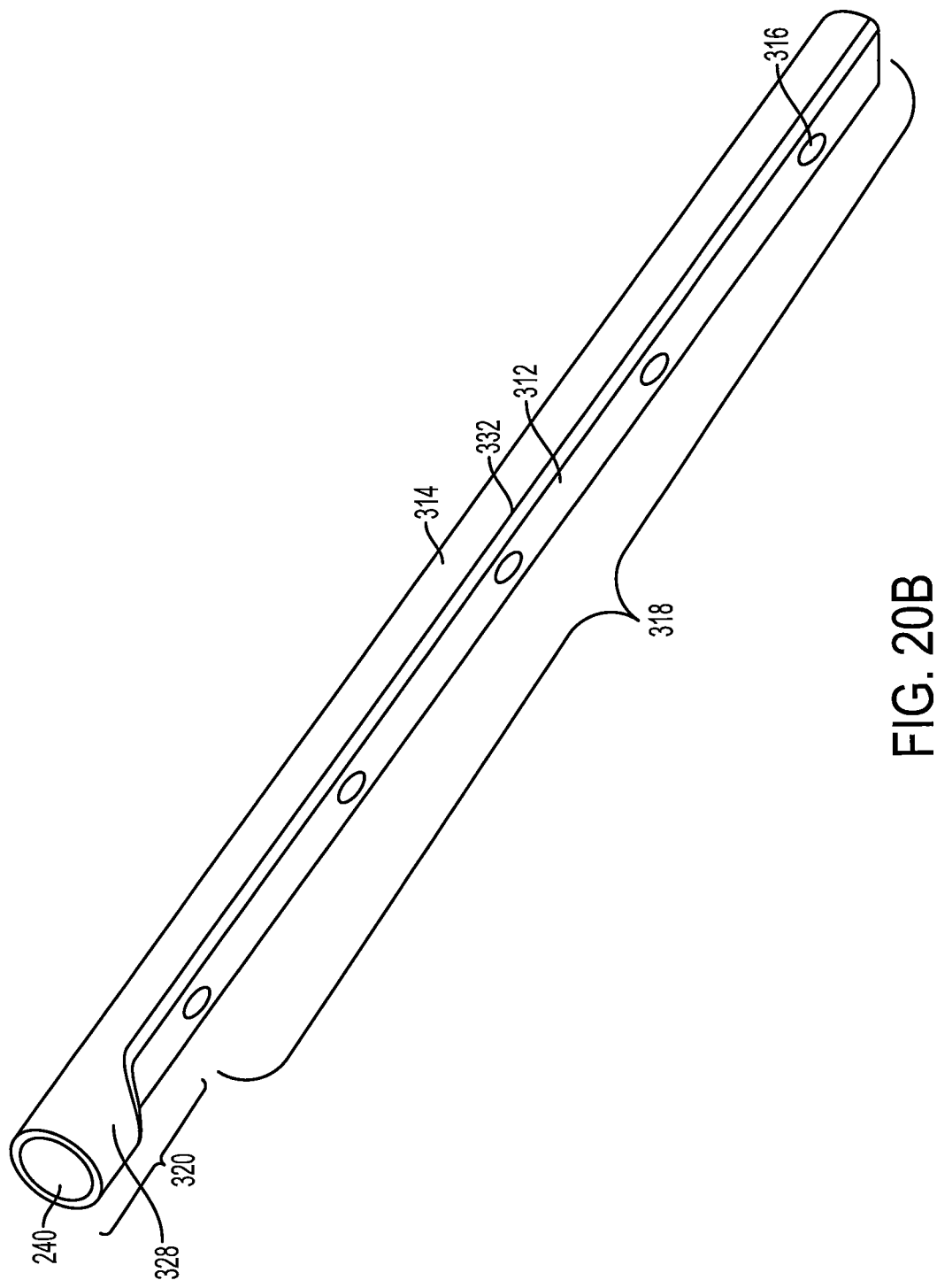

As shown in FIGS. 12 and 13, the first plate 202 has a number of features and is very similar to the first plate 202 in the first embodiment shown in FIGS. 3-8.

The first plate 202 of the second embodiment (FIGS. 9-13) is generally in the form of an upside-down, dished-plate. The first plate 202 of the heat exchanger 200 has a first end 206 (also noted as, first plate first end) and a second end 208 (also noted as, first plate second end) that is opposite to the first end 206 of the first plate 202. The first plate 202 has a central generally planar portion 210 formed between the first end 206 and second end 208 of the first plate 202. A peripheral wall 212 extends from the edge of the central planar portion 210 in a first direction towards the second plate 204. In other words, the central planar portion 210 is attached to a first end 214 (also noted as, peripheral wall first end) of the peripheral wall 212. On the second end 216 (also noted as, peripheral wall second end), a peripheral flange 218 is attached that extends outwardly and away from the central planar portion 210. Therefore, the central planar portion 210 is located below the plane of a peripheral flange 218 (as shown in FIG. 12).

The central planar portion 210 of the first plate 202 is provided with a plurality of spaced-apart generally U-shaped ribs 220. The U-shaped ribs are positioned so that they are also spaced-apart from the peripheral wall 212 that extends from the central planar portion 210. In addition, as shown in FIGS. 12 and 13, the base 222 of the U-shaped ribs 220 is proximate to the first end 206 of the first plate 202, with the arms 224 of the U-shaped ribs 220 extending towards the second end 208 of the first plate 202. In other words, the open end 226 of the U-shaped ribs 220 is proximate to the first plate second end 208, with the base 222 being proximate to the first plate first end 206.

The U-shaped ribs 220 extend in the same direction (the first direction) as the peripheral wall 212, with the base 222 and the arms 224 of the U-shaped ribs 220 being provided with flat top surfaces that are co-planar with the flange 218. This allows the flange 218 and the flat top surfaces of the U-shaped ribs provide contact surfaces or brazing surfaces for surface-to-surface contact with the second plate 204 when the first plate 202 and second plate 204 are brazed or otherwise sealed together. In addition, brazing or sealing of the first plate 202 and second plate 204, along with the U-shaped ribs 220 provides fluid channels to attain the counter-flow, as described herein.

As the base 222 of the U-shaped ribs 220 is spaced-apart from the peripheral wall 212 close to the first end 206 of the first plate 202, a first manifold region 228 is provided that permits fluid flow from the first end 206 towards the second end 208 of the first plate 202. Due to the presence and positioning of the U-shaped ribs 220, with the base 222 being closer to the first end 206, fluid can flow only in between two adjacent U-shaped ribs 220, or in between the peripheral wall 212 and the U-shaped rib 220 adjacent to it. This provides a first channel 230 (labeled as 'Channel A') where the fluid flows away from the first manifold region 228.

Once the fluid reaches the peripheral wall 212 close to the second end 208 of the first plate 202, it turns and enters the open-end 226 of the U-shaped ribs 220 and travels towards the first end 206 of the first plate 202. Thus, the passage between the two arms 224 of each U-shaped rib 220 provides a second channel 232 (labeled as 'Channel B'), where the flow of the fluid is in an opposite direction (counter-flow) to the flow of the fluid in the first channel 230 (channel 'A'). The fluid flow is further illustrated using arrows in FIGS. 11 and 12, although it should be recognized that FIG. 11 shows a bottom view with the fluid flowing in between the first plate 202 and the second plate 204, with the arrows in FIG. 11 being drawn as illustrative and for purposes of describing the second embodiment.

As the fluid reaches close to the second end 208 of the first plate 202, the peripheral wall 212 close to the second end 208 helps to direct the fluid into the open-end 226 of the U-shaped ribs 220, and flow into the second channels 232 (channels 'B'). In the second channels 232, the flow of the fluid is in an opposite direction to the flow of the fluid in the first channels 230, resulting in the counter-flow heat exchanger 200. The fluid then flows from the second end 208 towards the first end 206 of the first plate 202, however, is stopped by the base 222 of the U-shaped ribs 220.

In the second embodiment shown in FIGS. 9-13, the central planar portion 210 of the first plate 202 are provided with apertures 270 (also noted as 'first plate apertures') that are formed in the second channel 232. In a preferred embodiment, as shown in FIGS. 9-13, the first plate apertures 270 are formed close to the base 222 of the U-shaped ribs 220 and permit fluid flow out of the second channel 232 (as shown by arrows in FIG. 12), which then exits the heat exchanger 200, as described herein.

As shown in FIGS. 12 and 13, the first plate first end 206 has a first indentation 234 formed therein that extends from the first end 206 to the first manifold region 228 to allow fluid to flow into (or out of) the fluid manifold region. When the heat exchanger 200 is assembled, the first indentation 234 with the other plates of the heat exchanger 200 can form the inlet 238 (FIG. 9-11), as described herein. Thus, when fluid enters the first manifold region 228 from the inlet, it can flow into the first channels (channels 'A') for flow towards the second end 208 of the first plate 202.

In comparison to the first embodiment (FIGS. 3-8), the first plate 202 of the second embodiment shown in FIGS. 9-13, doesn't disclose a second indentation (as present in the first embodiment) at the flange portion 218 at the first end 206. However, as should be recognized based on the description herein, the flange portion 218 at the first end 206 can be provided with a second indentation similar to the second indentation formed in the first embodiment.

The second embodiment (FIGS. 9-13) of the heat exchanger 200 has a second plate 204 (or cover plate). The second plate 204 is sized to be similar to the first plate 202, so when the first plate 202 and second plate 204 brought together for sealing or brazing, the edges 242 of the second plate 204 align with edges 244 of the flange 218, for forming the plate pair.

In contrast to the first embodiment (FIGS. 3-8), the second plate 204 in the second embodiment (FIGS. 9-13) is a generally flat planar plate, and can provide the surface on which the individual battery cell containers 12 are stacked when the heat exchanger 200 (or 10 in FIGS. 1 and 2) is arranged with the battery unit 100, similar to the arrangement shown in FIGS. 1 and 2. The flat, planar surface of the second plate 204 also provides the primary heat transfer surface 13 of the heat exchanger 200, while the flattened manifold section on the ribbed-side can provide the surface for installation of an e-heater (not shown) for heating battery units, if required.

At the first end 250 (also noted as 'second plate first end') of the second plate 204, a first indentation 272 (also noted as 'second plate first indentation') is formed that extends in a first direction (i.e., in the same direction as the U-shaped ribs 220 extend from the central planar portion 210). The second plate first indentation 272 is formed to be complementary to the first plate first indentation 234, such that when the first plate 202 and the second plate 204 are brought together for sealing or brazing, the first plate first indentation 234 and the second plate first indentation 272 together form the inlet 238 (or outlet, depending upon design and application requirements).

The second plate first indentation 272 extends from the second plate first end 250 to a portion of the second plate 204 such that the edges of the second plate first indentation 272 can align with edges of the first plate first indentation 234, to permit fluid flow into the first manifold region 228. However, the second plate first indentation 272 should not extend into the planar portion of the second plate 204 to the point that fluid entering the heat exchanger 200 can flow directly into the second channels 232 or the first plate aperture 270.

The second embodiment (FIGS. 9-13) of the heat exchanger is also provided with a channel plate pair 274 for permitting fluid to exit the heat exchanger 200. The channel plate pair 274 is made up of a channel first plate 276 and a channel second plate 278. The channel first plate 276 on one side is contact with the first plate 202 of the heat exchanger 200, and on the other side in contact with the channel second plate 278. In other words, the channel first plate 276 is sandwiched between the first plate 202 of the heat exchanger 200 and the channel second plate 278.

The channel first plate 276 is a generally flat planar plate having a sealing planar portion 280 and channel first plate flange 282 that extends from a first end 284 (also noted as, 'sealing planar portion first end') of the sealing planar portion 280. The channel planar portion 280 can provide a planar surface for attachment and sealing to the first plate 202 of the heat exchanger 200. In addition, the channel planar portion 280 has a plurality of spaced-apart through holes 286 formed therein, along the length of the channel planar portion 280.

As shown in FIGS. 12 and 13, the channel planar portion 280 extends along width of the first plate 202, such that it can be positioned to cover the first plate apertures 270. The through holes 286 on the channel first plate 276 are formed such that when the channel first plate 276 is positioned against the first plate 202 of the heat exchanger 200, the edges of the channel first plate 276 that define the through holes 286 generally align with the edges of the central planar portion 210 of the first plate 202 that define the first plate apertures 270, to permit fluid to flow through the first plate apertures 270 and pass through the holes 286 in the channel planar portion 280.

The channel first plate flange 282 that extends from the sealing planar portion first end 284 of the sealing planar portion 280 has a step 288 and a channel first plate indentation 290. The channel first plate indentation 290 extends from an edge 292 of the flange 282 and extends towards the sealing planar portion 280. The step 288 is provided between the channel first plate indentation 290 and the sealing planar portion first end 284. The presence of the step 288 can help to ensure that when the heat exchanger 200 is formed by sealing or brazing the first plate 202, second plate 204 and the channel plate pair 274, the inlet 238 and outlet 240, generally lie in the same plane as the heat exchanger 200, with the inlet 238 and outlet 240 extending out side-ways to establish a side-entry fitting.

As noted above, the channel plate pair 274 is made up of a channel first plate 276 and a channel second plate 278. The channel first plate 276 on one side is contact with the first plate 202 of the heat exchanger 200, and on the other side in contact with the channel second plate 278. The channel second plate 278 is similar to the third plate 258 of the first embodiment (FIGS. 3-8) and helps to provide the passage for fluid outflow from the heat exchanger 200.

The channel second plate 278 is a generally flat plate having a channel second plate planar portion 296 and a channel second plate flange 298 extending from an edge 300 (also noted as 'channel second plate edge') of the channel second planar portion 296 (similar to the channel first plate 276).

The channel second plate planar portion 296 has a duct or groove 260 formed therein that protrudes in a second direction (the opposite direction of the U-shaped ribs 220 extending from the central planar portion 210 of the first plate 202). The direction of the duct or groove 260 formed in the channel second plate 278 is opposite to the direction in the first embodiment (FIGS. 3-8), as the channel second plate 278 is positioned on the ribbed side of the heat exchanger 200 next to the first plate 202, rather than being on the flat side of the heat exchanger 200 adjacent to the second plate 204.

The duct or groove 260 is formed to be aligned with and in fluid communication with the through holes 286, allowing fluid from channel 'B' in the first plate 202 to flow through the first plate apertures 270 and the through holes 286 in the channel first plate, and enter into the duct or groove 260. In addition, as shown in FIGS. 9-13, the duct or groove 260 can provide a manifold section for fluid flow. Moreover, the duct or groove 260 is flattened providing a planar surface for positioning an e-heater (not shown).

The channel second plate flange 298 has an indentation 294 (also noted as 'channel second plate indentation') that extends from an edge 302 (also noted as 'channel second plate flange edge') of the flange to the duct or groove 260 to allow fluid to flow from the duct or groove 260 into the passage formed by the channel second plate indentation 294.

The channel second plate flange 298 has a step 304 that bends from the plane having the channel second plate planar portion 296 towards the plane having the channel first plate 276. This can help with ensuring that the inlet 238 and outlet 240 lie in the same plane when the heat exchanger 200 is assembled. In addition, when the channel first plate 276 and the channel second plate 278 are brought together for sealing or brazing, the edges of the channel first plate 276 can align with edges of the channel second plate 278, including the edges 292 of the channel first plate flange 282 and the edges 302 of the channel second plate flange 298. Further, the edges of the channel second plate indentation 294 can align with edges of the channel first plate indentation 290 to form the outlet 240, to form the passage for fluid to flow from the duct or groove 260 and exit the heat exchanger 200.

The shape and structure of the channel second plate indentation 294 is not particularly limited, and can be varied depending upon design and application requirements. In one embodiment, as shown in FIGS. 12 and 13, the channel second plate indentation 294 has a first part 306 that extends from the edge of the channel second plate flange 302 and is shaped to receive a tubing 308. The first part 306 of the channel second plate indentation 294 at a position between the edge of the channel second plate flange 302 and the step 304 on the channel second plate flange 298 can be provided with a stop 310 (or crimp point), which can help to affix the tubing 308 in place.

When the first plate 202, second plate 204, and channel plates 274 are brought together and sealed or brazed, the heat exchanger 200 provides a passage for fluid to flow in the inlet 238 to the first manifold region 228. From the first manifold region 228, fluid flows to through channels A 230 and then counter flows in channels B 232. At the end of the passage formed by channels B 232, fluid escapes through apertures 270 into the duct or groove 260, from where it flows out from the outlet 240.

FIGS. 14-20 relate to a third and fourth embodiment of a heat exchanger 200, where the heat exchanger is formed of first plate 202, a second plate 204 and a duct system 310 coupled to the first plate 202. In the third and fourth embodiments, the first plate 202 and the second plate 204 are the same as the first and second plates 202, 204 disclosed in the second embodiment (FIGS. 9-13); and the reader is directed to the description herein for a description of the first plate 202 and the second plate 204 of the second embodiment. In addition, although the duct system is shown on the ribbed side of the heat exchanger, it can be present on the flat side of the heat exchanger, as in the first embodiment.

The second embodiment (FIGS. 9-13) is provided with a channel plate pair 274 to permit fluid to flow and exit from the passage defined by the first and second plates 202, 204. In the third and fourth embodiments (FIGS. 14-20), the channel plate pair 274 of the second embodiment is replaced by duct system 310 (analogous to the duct or groove 260 provided by the channel plate pair 274 in the second embodiment), and which provides the passage to permit fluid to flow and exit from the passage defined by the first and second plates 202, 204.

The duct system 310 disclosed herein can be considered as having two portions, a first portion 318 (also noted as 'first duct system portion') of the duct system 310 that helps to collect fluid that exits from the apertures 270 from the first heat exchanger plate 202, and a second portion 320 (also noted as 'second duct system portion') of the duct system 310 that directs fluid out of the heat exchanger 200.

The first duct system portion 318 used in the third and fourth embodiments of the heat exchanger (FIGS. 14-20) can be formed using a hollow semi-circular tube having a flat planar surface 312 and a semi-circular elongated shell 314 that is coupled to the flat planar surface 312 at the edge 316 of the semi-circular elongated shell 314. The coupling of the semi-circular elongated shell 314 to the flat planar surface 312 helps to provide a hollow interior in the duct system 310, which is like a hollow semi-circular tube, and is analogous to the duct or groove 260 provided by the channel plate pair 274 in the second embodiment (FIGS. 9-13), disclosed herein.

The flat surface 312 of the duct system 310 is coupled to the first heat exchanger plate 202 to affix the first duct system portion 318 in place, and can extend along the width of the heat exchanger plate pair 202, 204. As should be recognized by a person of skill in the art, the length and width of the heat exchanger 200 can vary depending upon the design of the heat exchanger 200, and the reference to the width is exemplary only, and with reference to figures. In addition, the flat surface 312 of the first duct system portion 318 is provided with a plurality of orifices 316 that align with the plurality of apertures 270 present in the first plate 202 to permit fluid to flow from the heat exchanger plate pair 202, 204 into the first duct system portion 318, and from where the fluid can exit the heat exchanger 200 through the second duct system portion 320, which is fluid communication with the first duct system portion 318.

In the third embodiment (FIGS. 14(a)-20(a)), the second duct system portion 320 is positioned perpendicular to the first duct system portion 318, resulting in the outlet 240 being on the same side of the heat exchanger 200 as the inlet 238 (and similar to the second embodiment show in FIGS. 9-13). In contrast, in the fourth embodiment (FIGS. 14(b)-20(b)), the second duct system portion 320 extends along the length of the first duct system portion 318, extending along the width of the heat exchanger plate pair 202, 204, resulting in the outlet 240 being perpendicular to the inlet 238.

In the second duct system portion 320 of the third embodiment (FIGS. 14(a)-20(a)), a flange 322 is provided that is coupled to the flat planar surface 312, and extends perpendicularly from the flat planar surface 312. The flange 322 has a first section 324 that is similar to the flat planar surface 312, and can be sealed or brazed to the first heat exchanger plate 202. The second section 326 of the flange 322 can be provided with an indentation 328, which can be semi-circular and used for forming the outlet 240 of the heat exchanger 200.

In addition, the second portion of 320 of the duct system 310 is also provided with a second semi-circular elongated shell 330 that is coupled to and extends from the first semi-circular elongated shell 314. The edges 332 of the second semi-circular elongated shell 330 can be coupled to the edges of the flange 322 and to the edges of the indentation 328 to form a conduit that is in fluid communication with the first duct system portion 318, and to form the outlet 240 for flow of the fluid from the first duct system portion 318 to the second duct system portion 320, and exit the heat exchanger 200 from the outlet 240.

In the third embodiment (FIGS. 14(a)-20(a)), first portion 318 of the duct system 310 is also provided with walls 334 that extend from opposing ends of the flat planar surface 312 and are coupled to the first semi-circular elongated shell 314 to enclose the first portion 318 of the duct system 310. The walls are present at the longitudinal ends of the first portion 318 of the duct system 310, with the second portion 320 of the duct system 310 extending in between the two opposing ends along the length of the first portion 318.

In the fourth embodiment (FIGS. 14(b)-20(b)), the second portion 320 of the duct system 310 extends along the length of the first portion 310, with the flat planar portion 312 extending beyond the edge of the heat exchanger 200. The portion of the flat planar portion 312 near the edge of the heat exchanger 200 and extends beyond the edge can be considered as the second portion 320 of the duct system. In addition, similar to the third embodiment, an indentation 328 can be formed on the flat planar portion 312 that extends beyond the edge of the heat exchanger 200. The indentation 328 along with the first semi-circular elongated shell 314 forming the outlet 240 of the heat exchanger.

In the fourth embodiment (FIGS. 14(b)-20(b)), there is no need to provide a second semi-circular elongated shell as in the third embodiment (FIGS. 14(a)-20(b)). Rather, the first semi-circular elongated shell 314 extends beyond the edge of the heat exchanger 200 to form the outlet, which permits fluid to flow from the first portion 318 and exit the heat exchanger 200. In addition, only a single wall 334 is provided, extending from the flat planar surface 312 at an end opposed to the outlet 240, and coupled to the first semi-circular elongated shell 314 to enclose the duct system 310, and direct flow towards the outlet 240.

Figure 21:
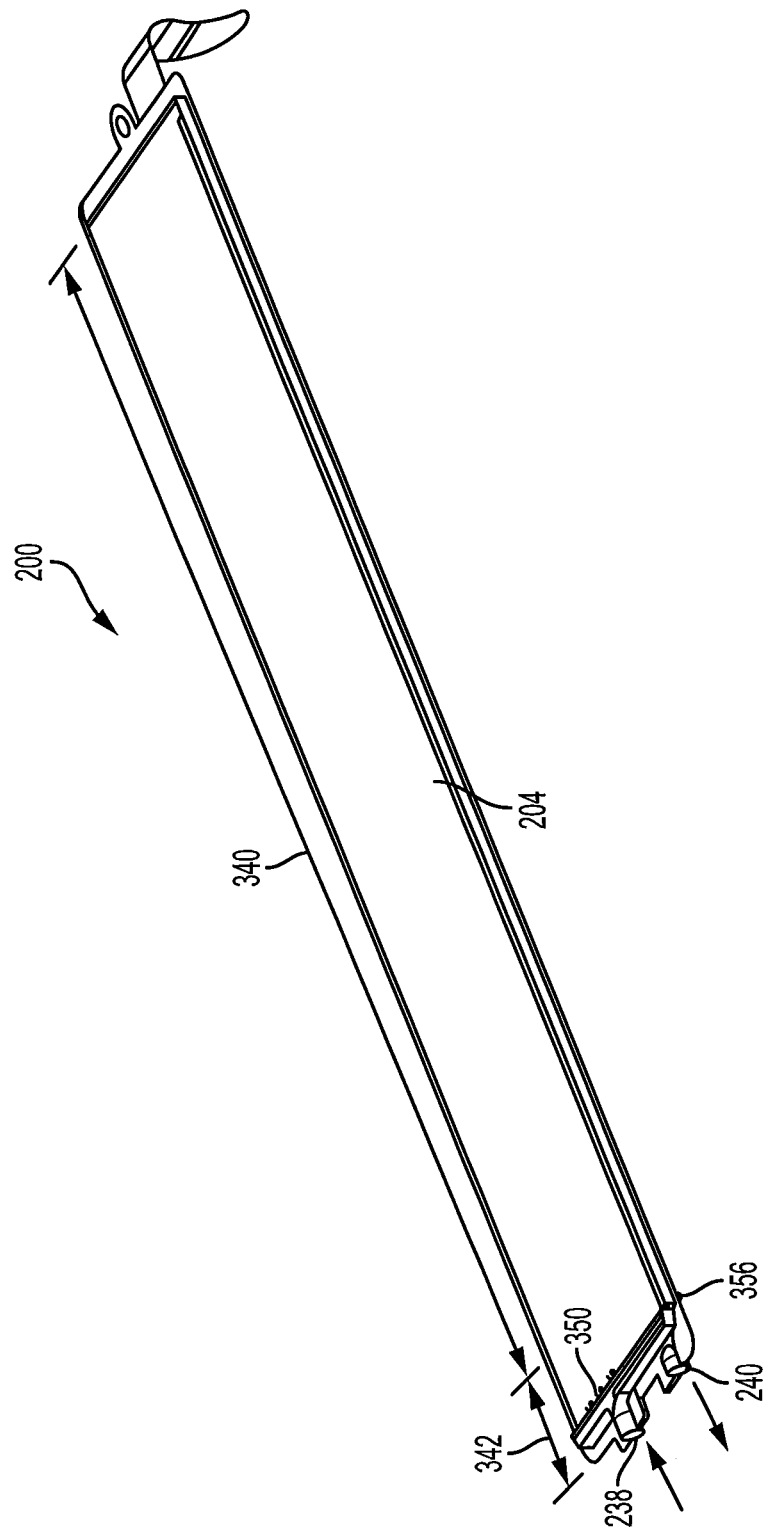
FIG. 21 shows a perspective view of a fifth embodiment of a battery cell heat exchanger in accordance with specification.
Figure 22:
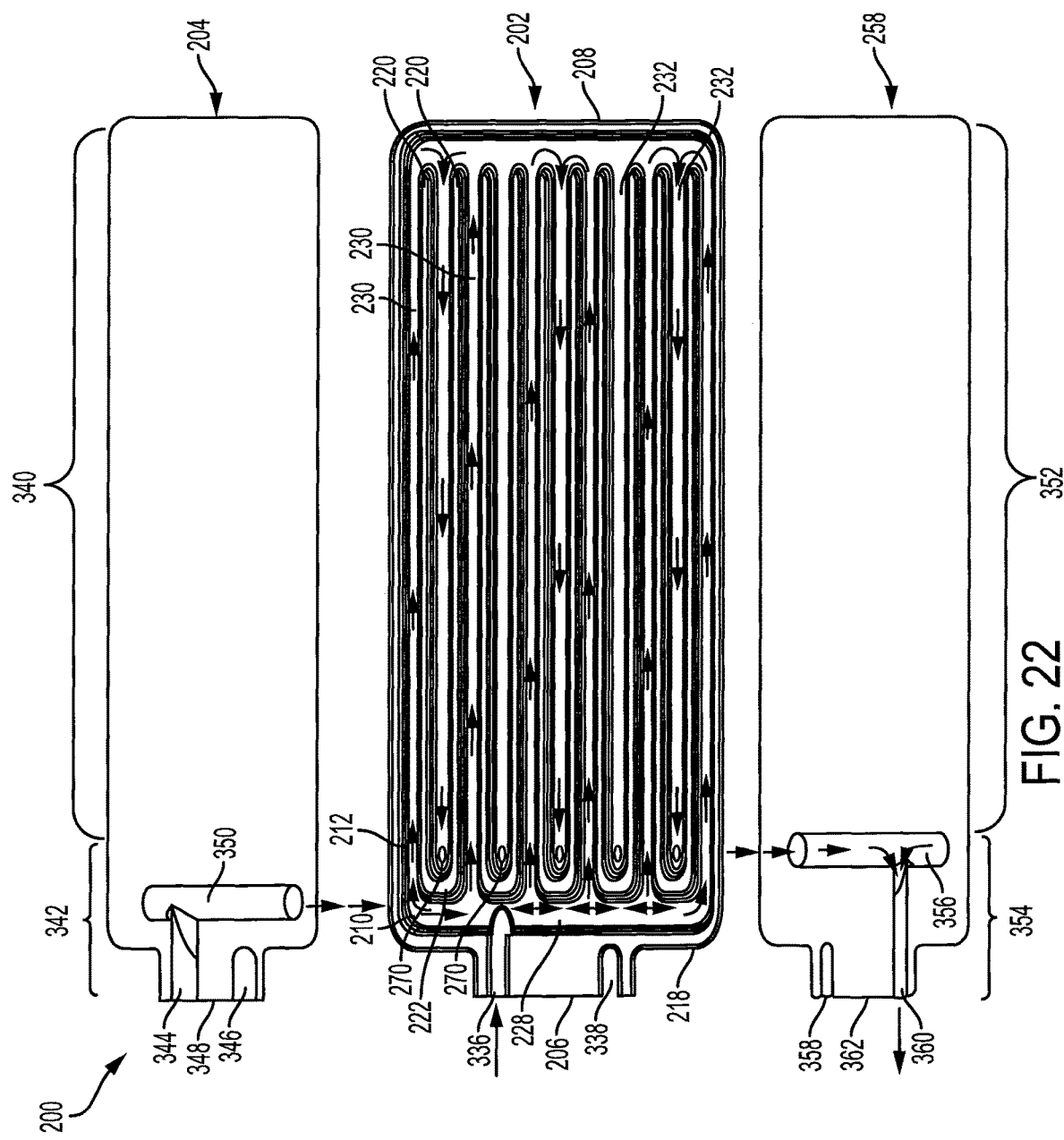
FIG. 22 shows an exploded side view of the fifth embodiment of a battery cell heat exchanger in accordance with specification.

FIGS. 21 and 22 relate to a fifth embodiment of a battery cell heat exchanger 200, where the heat exchanger 200 is a three-piece construction, having similarities to the other embodiments disclosed herein in FIGS. 3-19.

As shown in FIG. 22, the heat exchanger 200 is made up of a first plate 202, a second plate 204 and a third plate 258. Similar to the first embodiment (FIGS. 3-8), the first plate 202 can also be described as a ribbed-plate, the second plate 204 can also be described as a cover plate, and the third plate 258 can be ascribed a channel plate.

Similar to the second to fourth embodiments (FIGS. 9-19), the first plate 202 of the fifth embodiment (FIGS. 21 and 22) is provided a ribbed-plate, formed from an upside-down dished plate. The first plate 202 (similar to the other first plates disclosed with respect to the other embodiments disclosed herein) has a first end 206, a second end 208, a central planar portion 210, a peripheral wall 212 having a flange 218, U-shaped ribs 220, a first manifold region 228 in fluid communication with a first channel 230 ('channel A'), which is in fluid communication with a second channel 232 ('channel B'). Also, provided are first plate apertures 270 (similar to the second to fourth embodiments disclosed herein) that allow fluid to flow out from, once the fluid reaches close to the base 222 of the U-shaped ribs 220.

In contrast to the other embodiments, the first plate 202 of the fifth embodiment (FIG. 22) has a first slit 336 (also noted as 'first plate first slit') and a second slit 338 (also noted as 'first plate second slit') formed at the first end 206 of the first plate 202. The first slit 336 on the first plate 202 is formed from the edge of the flange 218 at the first end 206 of the first plate to the central planar portion 210 of the first plate 202. The length of the first slit 336 can help to allow a larger volume of fluid from the inlet 238 to the central planar portion 210 of the first plate 202. The second slit 338 on the first plate 202 is formed from the edge of the flange 218 at the first end 206 of the first plate 202 and ends prior to reaching the end of the peripheral wall 212 that is attached to the flange 218 (in other words, where the flange 218 ends).

In the fifth embodiment (FIGS. 21 and 22), the second plate 204 (cover plate) and the third plate 258 (channel plate) are similar to each other, having similarities to the third plate 258 of the first embodiment (FIGS. 3-8). As shown in FIG. 22, the second plate 204 and the third plate 258 extend along the entire length of the heat exchanger 200. However, as should be recognized based on the disclosure herein, the third plate 258 can be made shorter in length, similar to the third plate 258 of the first embodiment (FIGS. 3-8).

The second plate 204 has a first, generally planar portion 340 (noted as 'second plate planar portion', and is analogous to the first planar portion 246 of the second plate of the first embodiment), upon which the individual battery cell containers 12 are stacked when the heat exchanger 200 (or 10 in FIGS. 1 and 2) is arranged with the battery unit 100, similar to the arrangement shown in FIGS. 1 and 2. The first planar portion 340 of the second plate 204 defines the primary heat transfer surface 13 of the heat exchanger 200.

The second plate 204 also has a manifold portion 342 (noted as 'second plate manifold portion'), which has a duct or groove 350 (also noted as 'second plate duct or groove') formed therein that protrudes in a first direction (the same direction as the U-shaped ribs 220 extend from the central planar portion 210 of the first plate 202). In addition, the second plate duct or groove 350 is aligned to be in fluid communication with the first manifold region 228 of the first plate 202, such that fluid that enters through the inlet 238 is directed to the first manifold region 228, for flow in the first channel 230 (channel A).

The second plate 204 has a first indentation 344 (also noted as 'second plate first indentation') and a second indentation 346 (also noted as 'second plate second indentation'). The second plate first indentation 344 and the second plate second indentation 346 both extend in the first direction (same as the duct or groove 260).

The second plate first indentation 344 extends from the first end 348 of the second plate 204 (also noted as 'second plate first end'), to the second plate duct or groove 350, and is in fluid communication with the duct or groove 350, permitting fluid to flow from the second plate duct or groove 350 to the first manifold region 228. When the first, second and third plates 202, 204 and 258 of the heat exchanger 200 are brought together for sealing or brazing, the edges of the second plate first indentation 344 align with longitudinal edges that extend from the first end 206 to the central planar portion 210 of the first plate 202 and which define the first slit 336.

The second plate second indentation 346 extends from the first end 348 of the second plate 204 and ends so that the edges of the second plate second indentation 346 align with the edges of the first plate 202 that define the second slit 338.

The third plate 258 has a first, generally planar portion 352 (noted as 'third plate planar portion') and a manifold portion 354 (noted as 'third plate manifold portion') adjacent to the third plate planar portion 352. The third plate manifold portion 354 has a duct or groove 356 (also noted as 'third plate duct or groove') formed therein that protrudes in a second direction (opposite the direction of the U-shaped ribs 220 extending from the central planar portion 210 of the first plate 202). In addition, the third plate duct or groove 356 is aligned to be in fluid communication with the first plate apertures 270 of the first plate 202, such that fluid flowing from the first plate apertures 270 can get collected in the third plate duct or groove 356 before exiting the heat exchanger 200.

The third plate 258 has a first indentation 358 (also noted as 'third plate first indentation') and a second indentation 360 (also noted as 'third plate second indentation'). The third plate first indentation 358 and the third plate second indentation 360 both extend in the second direction (same as the third plate duct or groove 356).

As shown in FIG. 22, the third plate first indentation 358 extends from the first end 362 of the third plate 258 (also noted as 'third plate first end'), and ends so that the edges of the third plate first indentation 358 do not extend beyond the flange 218 in the first plate 202. However, it is possible to have a heat exchanger 200 where the third plate first indentation 358 extends from the first end 362 of the third plate 258 towards the opposing end and has edges that allow fluid to flow into the first plate manifold portion 210. This also results in the edges of the third plate first indentation 358 aligning with the edges of second plate first indentation 344, such that, when the first, second and third plates 202, 204 and 258 are brought together for sealing, the second plate first indentation 344 together with the third plate first indentation 358 form the inlet 238 of the heat exchanger 200, permitting fluid to flow into the first manifold region 228 in the first plate 202.

The third plate second indentation 360 extends from the first end 362 of the third plate 258 to the third plate duct or groove 356, and is in fluid communication with the third plate duct or groove 356, permitting fluid to flow from the third plate duct or groove 356 to the third plate second indentation 360. When the first, second and third plates 202, 204 and 258 of the heat exchanger 200 are brought together for sealing or brazing, the edges of the third plate second indentation 360 align with longitudinal edges (that extend from the first end 250 to the second end 268) of the second plate 204 that define the second slit 346.

This alignment and positioning of the first, second and third plates 202, 204 and 258 results in the edges of the third plate first indentation 358 aligning with the edges of first plate first slit 336 and second plate first indentation 344, such that, when the first, second and third plates 202, 204 and 258 are brought together for sealing, the edges of the third plate first indentation 358, the first plate first slit 336 and second plate first indentation 344 together form the inlet 238 of the heat exchanger 200, permitting fluid to flow into the first manifold region 228 in the first plate 202.

In addition, alignment and positioning of the first, second and third plates 202, 204 and 258 results in the edges of the third plate second indentation 360 aligning with the edges of first plate second slit 338 and the second plate second indentation 346, such that, when the first, second and third plates 202, 204 and 258 are brought together for sealing, third plate second indentation 360, first plate second slit 338 and the second plate second indentation 346, together form the outlet 240 of the heat exchanger 200, permitting fluid to flow from the channel 'B' through the aperture 270 into the third plate duct or groove 356, and finally into the third plate second indentation 360 before exiting through the outlet 240 of the heat exchanger 200. Moreover, such alignment and positioning results in both the inlet 238 and outlet 240 being in the same plane as the plane of the heat exchanger 200.

Certain adaptations and modifications of the described embodiments can be made. Therefore, the above discussed embodiments are considered to be illustrative and not restrictive.

| Parts list | |
| --- | --- |
| No. | Description |
| 200 | battery cell heat exchanger |
| 202 | First plate of HX |
| 204 | Second plate of HX |
| 206 | First end of first plate |
| 208 | Second end of first plate |
| 210 | Planar portion of first plate |
| 212 | Peripheral wall |
| 214 | First end of peripheral wall |
| 216 | Second end of peripheral wall |
| 218 | Peripheral flange |
| 220 | U-shaped ribs |
| 222 | Base of U-shaped ribs |
| 224 | Arms of U-shaped ribs |
| 226 | Open end of U-shaped ribs |
| 228 | First manifold region |
| 230 | First channel (A) |
| 232 | Second channel (B) |
| 234 | First indentation |
| 236 | Second indentation |
| 238 | Inlet |
| 240 | Outlet |
| 242 | Edges of second plate |
| 244 | Edges of flange ($1^{st}$ plate) |
| 246 | $1^{st}$ planar region of $2^{nd}$ plate |
| 248 | $2^{nd}$ planar region of $2^{nd}$ plate |
| 250 | second plate first end |
| 252 | Second plate apertures |
| 254 | First slit |
| 256 | Second slit |
| 258 | Third plate (channel plate) |
| 260 | duct or groove |
| 262 | Third plate first indentation |
| 264 | Third plate second indentation |
| 266 | Third plate first end |
| 268 | Second end second plate |
| 270 | First plate aperture |
| 272 | second plate first indentation |
| 274 | Channel plate pair |
| 276 | channel first plate |
| 278 | channel second plate |
| 280 | sealing planar portion |
| 282 | channel first plate flange |
| 284 | sealing planar portion first end |
| 286 | Holes in channel first plate |
| 288 | Step on channel $1^{st}$ plate flange |
| 290 | channel first plate indentation |
| 292 | Edge of channel $1^{st}$ plate flange |
| 294 | channel $2^{nd}$ plate indentation |
| 296 | Channel $2^{nd}$ plate planar portion |

-continued

| Parts list | |
| --- | --- |
| No. | Description |
| 298 | channel second plate flange |
| 300 | channel second plate edge |
| 302 | Edge of channel $2^{nd}$ plate flange |
| 304 | Step on channel $2^{nd}$ plate flange |
| 306 | $1^{st}$ part of $2^{nd}$ plate indentation |
| 308 | Tubing |
| 310 | Duct system |
| 312 | flat planar surface |
| 314 | semi-circular elongated shell |
| 316 | Orifice |
| 318 | first duct system portion |
| 320 | Second duct system portion |
| 322 | Flange from flat planar surface |
| 324 | First section of flange |
| 326 | Second section of flange |
| 328 | Indentation on 322 |
| 330 | $2^{nd}$ semi-circular elongated shell |
| 332 | Edge of 330 |
| 334 | Wall of $1^{st}$ elongate shell |
| 336 | First slit on $1^{st}$ plate |
| 338 | Second slit on $1^{st}$ plate |
| 340 | $2^{nd}$ plate planar portion (Emb 5) |
| 342 | second plate manifold portion |
| 344 | second plate first indentation |
| 346 | second plate second indentation |
| 348 | second plate first end |
| 350 | Second plate duct or groove |
| 352 | third plate planar portion |
| 354 | third plate manifold portion |
| 356 | third plate duct or groove |
| 358 | third plate first indentation |
| 360 | third plate second indentation |
| 362 | First end of third plate |

What is claimed is:

1. A battery cell heat exchanger comprising:

a pair of plates comprising a first plate and a second plate coupled at edges of the pair of plates, the pair of plates together defining a fluid passage having a first channel permitting fluid flow from a first end of the pair of plates towards a second end of the pair of plates, and a second channel permitting fluid flow from the second end towards the first end of the pair of plates; and an inlet or outlet at the first end of the pair of plates, the inlet or outlet being in fluid communication with the first channel;

the second plate having an aperture through the second plate permitting fluid flow from the second channel to a conduit or duct on a side of the second plate opposite the fluid passage;

the other of the inlet or outlet in fluid communication with the conduit or duct;

the inlet and the outlet positioned in a plane defined by the pair of plates;

the first plate having a first plate first indentation and a first plate second indentation, the first plate first indentation extending from the first end of the first plate to a central planar portion; and the second plate having a first slit and a second slit, the edges of the second plate defining the first slit aligning with the edges of the first plate first indentation to define one of the inlet or outlet, and the edges of the second plate defining the second slit aligning with the edges of the first plate second indentation to define the other of the inlet or outlet.

2. The battery cell heat exchanger according to claim 1, further comprising:

a third plate having the conduit or duct formed therein, the third plate and the first plate together sandwiching the second plate, the third plate having a third plate first indentation and a third plate second indentation, the third plate second indentation being in fluid communication with the conduit or duct;

wherein the first plate first indentation and the third plate first indentation together define one of the inlet or outlet, and the first plate second indentation and the third plate second indentation together define the other of the inlet or outlet.

3. The battery cell heat exchanger according to claim 2, wherein edges of third plate first indentation align with edges of the first plate first indentation, and the first plate second indentation being formed in a flange of the first plate.

4. The battery cell heat exchanger according to claim 1, further comprising:

a fourth plate having holes to permit fluid flow from the second channel to the conduit or duct, the fourth plate coupled to the first plate on one side and to a third plate on an opposing side, the fourth plate having a fourth plate flange extending towards the first end of the heat exchanger, the fourth plate flange having a fourth plate indentation, and the third plate having the conduit or duct, the conduit or duct having a planar surface, the third plate having a third plate flange extending towards the first end of the heat exchanger, a third plate flange having a third plate indentation, wherein the fourth plate indentation and the third plate indentation together define one of the inlet or outlet and are in fluid communication with the conduit or duct, and the second plate having apertures aligned with holes in the fourth plate to permit fluid flow from the second channel to the conduit.

5. The battery cell heat exchanger according to claim 4, wherein the fourth plate flange has a step and the third plate flange has a step that complements the step on the fourth plate flange for positioning the inlet or outlet defined together by the fourth plate first indentation and the third plate first indentation to be in a same plane as the other inlet or outlet defined together by the first plate and the second plate.

6. The battery cell heat exchanger according to claim 1, further comprising a duct system on the opposite side of the second plate from the fluid passage, the duct system having a flat longitudinal planar surface coupled to a first semi-circular elongated shell to define the conduit or duct, and the flat longitudinal planar surface having orifices aligned with apertures in the second plate to permit fluid flow from the second channel to the conduit or duct.

7. The battery cell heat exchanger according to claim 6 having a first duct system portion and a second duct system portion, the first duct system portion having the flat longitudinal planar surface with the orifices, the second duct system portion coupled to and extending perpendicularly from the first duct system portion, the second duct system portion in fluid communication with the conduit or duct and providing a passage for fluid to flow from the conduit or duct to the inlet or outlet, and wherein the inlet is positioned parallel to the outlet.

8. The battery cell heat exchanger according to claim 7, wherein the second duct system portion comprises a flange longitudinally coupled to a second semi-circular elongated shell, the flange at one end coupled to and extending from a flat planar surface of the first duct system portion, and an opposing end having an indentation formed on the flange in the second duct system portion, and the second semi-circular elongated shell coupled at one end to the first semi-circular elongated shell, wherein the indentation formed on the flange in the second duct system portion and the second semi-circular elongated shell together define the inlet or outlet.

9. The battery cell heat exchanger according to claim 1, having a first duct system portion and a second duct system portion, the first duct system portion having orifices aligned with apertures in the second plate to permit fluid flow from the second channel to the conduit or duct, the second duct system portion coupled to and axially extending from the first duct system portion, the second duct system portion in fluid communication with the conduit or duct and providing a passage for fluid to flow from the conduit or duct to the inlet or outlet, and wherein the inlet is positioned perpendicular to the outlet in the heat exchanger.

10. A battery cell heat exchanger, comprising:

a first plate and a second plate defining a fluid passage between the first and second plates, and the fluid passage comprising a first channel and a second channel, the first channel and the second channel permitting fluid flow in opposite directions, a first inlet or outlet positioned at a first end of the pair of plates, and the inlet or outlet being in fluid communication with the first channel, an aperture in the first plate permitting fluid flow from the second channel to a conduit or duct, and a third plate having the conduit or duct formed therein, the third plate and the second plate together sandwiching the first plate, the third plate forming a second inlet or outlet, and the third plate having a third plate first indentation and a third plate second indentation, the third plate second indentation being in fluid communication with the conduit or duct, the first plate has a first slit at the first end of the heat exchanger and extending to a first manifold portion, and a second slit at the first end of the heat exchanger, and the edges of the first plate defining the first slit align with the longitudinal edges of the second plate first indentation, and the edges of the first plate defining the second slit align with longitudinal edges of the second plate second indentation.

11. The battery cell heat exchanger according to claim 10, further comprising the second plate having a second plate duct or groove formed in the second plate, a second plate first indentation and a second plate second indentation formed at a first end of the second plate, the second plate first indentation extending from the first end of the second plate and in fluid communication with the second plate duct or groove.

12. The battery cell heat exchanger according to claim 11, wherein when the first plate, second plate, and third plate are positioned for forming the heat exchanger, longitudinal edges of the second plate first indentation align with the third plate first indentation to form the inlet or outlet, and the longitudinal edges of the second plate second indentation align with the third plate second indentation to form the other inlet or outlet.

13. The battery cell heat exchanger according to claim 11, wherein the second plate duct or groove is proximate to the first end of the heat exchanger and aligned to permit fluid to flow in a first manifold portion, and a third plate duct or groove is proximate to the second end of the heat exchanger relative to the second plate duct or groove and aligned to permit fluid to flow from the second channel to the third plate duct or groove.

14. A battery cell heat exchanger comprising:
 a first plate and a second plate defining a fluid passage between the plates, and the fluid passage comprising a first channel and a second channel;
 the first channel permitting fluid flow from a first end of the pair of plates towards a second end of the pair of plates;
 the second channel permitting fluid flow from the second end towards the first end of the pair of plates;
 a first inlet or outlet positioned at the first end of the pair of plates, and the first inlet or outlet being in fluid communication with the first channel;
 an aperture through the second plate permitting fluid flow from the second channel to a conduit, and the conduit formed on a side of the second plate opposite the fluid passage; and
 a third plate having the conduit formed therein, the third plate and the first plate together sandwiching the second plate;
 the first plate having a first plate first indentation and a first plate second indentation, the indentations of the first plate and indentations of the third plate defining both the first inlet or outlet and a second inlet or outlet; and
 the second plate having a first slit and a second slit, the edges of the second plate defining the first slit aligning with the edges of the first plate first indentation, and the edges of the second plate defining the second slit aligning with the edges of the first plate second indentation.

15. The battery cell heat exchanger of claim 14, further comprising a third plate forming the conduit.

16. The battery cell heat exchanger of claim 15, further comprising a second inlet or outlet formed by the third plate.

17. The battery cell heat exchanger of claim 14, further comprising a second inlet or outlet branching form the conduit.

18. The battery cell heat exchanger of claim 14, further comprising a second inlet or outlet formed by the third plate, and wherein the first inlet or outlet is formed by the first and second plates.

* * * * *